US012190830B2

(12) United States Patent
Mito

(10) Patent No.: US 12,190,830 B2
(45) Date of Patent: Jan. 7, 2025

(54) DISPLAY DEVICE WITH VARIABLE EMISSION LUMINANCE FOR INDIVIDUAL DIVISION AREAS OF BACKLIGHT, CONTROL METHOD OF A DISPLAY DEVICE, AND NON-TRANSITORY COMPUTER-READABLE MEDIUM

(71) Applicant: CANON KABUSHIKI KAISHA, Tokyo (JP)

(72) Inventor: Koji Mito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/358,319

(22) Filed: Jul. 25, 2023

(65) Prior Publication Data

US 2024/0054963 A1 Feb. 15, 2024

(30) Foreign Application Priority Data

Aug. 9, 2022 (JP) ................................ 2022-127328

(51) Int. Cl.
*G09G 3/34* (2006.01)
*G09G 3/36* (2006.01)

(52) U.S. Cl.
CPC ......... *G09G 3/3406* (2013.01); *G09G 3/3648* (2013.01); *G09G 2320/0233* (2013.01); *G09G 2360/16* (2013.01)

(58) Field of Classification Search
CPC ... G09G 2320/0646; G09G 2340/0407; G09G 3/002; G09G 3/3426
See application file for complete search history.

(56) References Cited

U.S. PATENT DOCUMENTS

| | | | | |
|---|---|---|---|---|
| 8,890,902 | B2 | 11/2014 | Johnson | |
| 9,633,587 | B2 | 4/2017 | Johnson | |
| 2011/0193896 | A1 | 8/2011 | Johnson | |
| 2013/0093802 | A1* | 4/2013 | Tanaka | G09G 5/10 345/690 |
| 2013/0321498 | A1* | 12/2013 | Otoi | G09G 3/3611 345/694 |
| 2015/0049132 | A1 | 2/2015 | Johnson | |
| 2017/0293205 | A1* | 10/2017 | Iwata | G09G 5/02 |

FOREIGN PATENT DOCUMENTS

JP 2012-505435 A 3/2012

* cited by examiner

*Primary Examiner* — Van N Chow
(74) *Attorney, Agent, or Firm* — Venable LLP

(57) ABSTRACT

A display device includes a backlight consisting of a plurality of division areas and a display panel. Emission luminance for each division area is calculated based on input image data, a correction value for correcting the input image data is calculated based on the emission luminance, the input image data is corrected based on the calculated correction value, the transmittance of the display panel is controlled based on the corrected image data, and light emission of each division area is controlled based on the calculated emission luminance. One frame period of the input image consists of a plurality of subframe periods, and a process of calculating the correction value for correcting the input image data based on the emission luminance is divided into a plurality of partial processes, which are sequentially performed by executing each partial process in each subframe period.

18 Claims, 18 Drawing Sheets

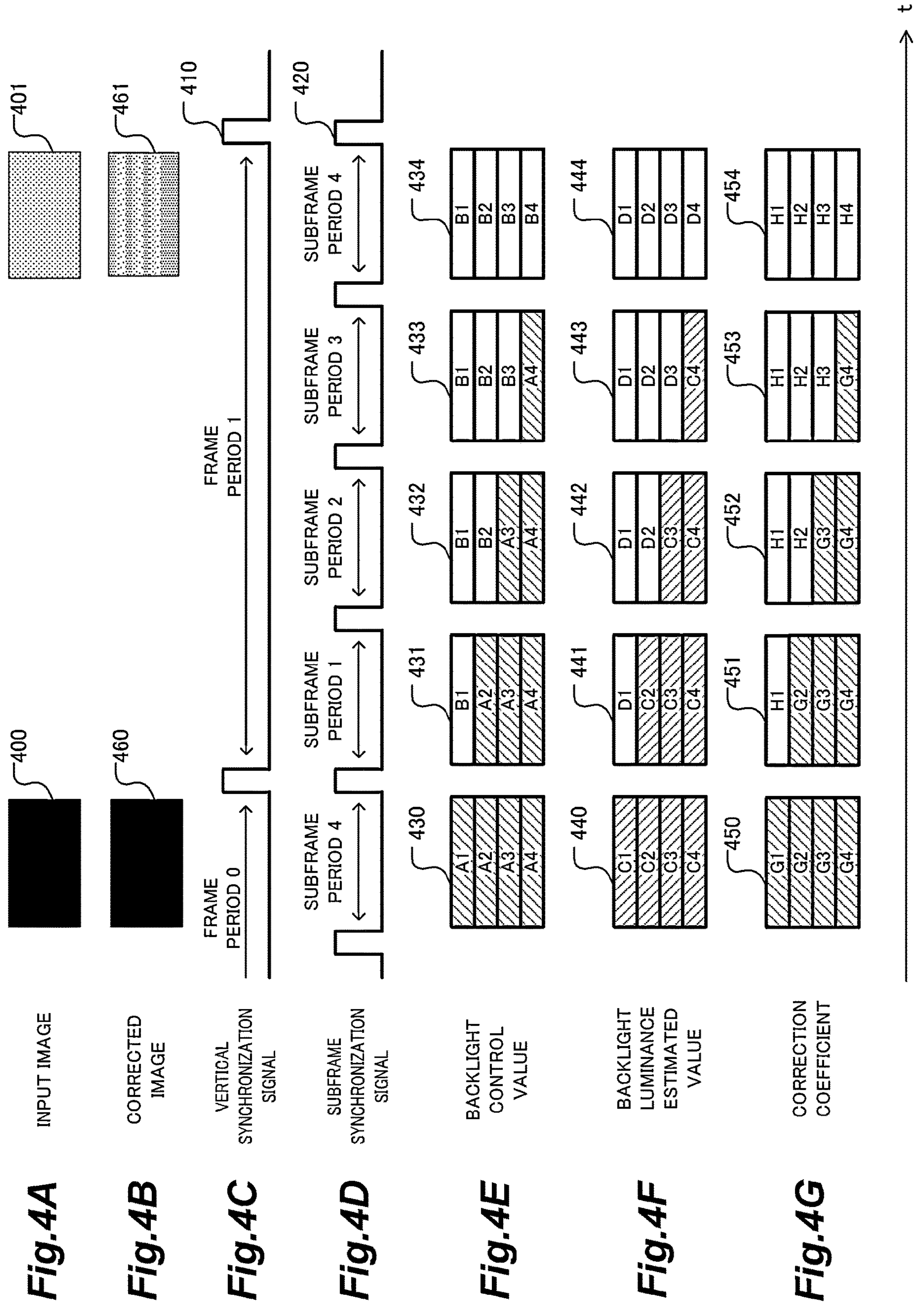
Fig.4A
INPUT IMAGE
400
401
Fig.4B
CORRECTED IMAGE
460
461
Fig.4C
VERTICAL SYNCHRONIZATION SIGNAL
410
FRAME PERIOD 0
FRAME PERIOD 1
Fig.4D
SUBFRAME SYNCHRONIZATION SIGNAL
420
SUBFRAME PERIOD 4
SUBFRAME PERIOD 1
SUBFRAME PERIOD 2
SUBFRAME PERIOD 3
SUBFRAME PERIOD 4
Fig.4E
BACKLIGHT CONTROL VALUE
430 A1 A2 A3 A4
431 B1 A2 A3 A4
432 B1 B2 A3 A4
433 B1 B2 B3 A4
434 B1 B2 B3 B4
Fig.4F
BACKLIGHT LUMINANCE ESTIMATED VALUE
440 C1 C2 C3 C4
441 D1 C2 C3 C4
442 D1 D2 C3 C4
443 D1 D2 D3 C4
444 D1 D2 D3 D4
Fig.4G
CORRECTION COEFFICIENT
450 G1 G2 G3 G4
451 H1 G2 G3 G4
452 H1 H2 G3 G4
453 H1 H2 H3 G4
454 H1 H2 H3 H4
t

INPUT IMAGE

CORRECTED IMAGE

VERTICAL SYNCHRONIZATION SIGNAL

SUBFRAME SYNCHRONIZATION SIGNAL

BACKLIGHT CONTROL VALUE

BACKLIGHT LUMINANCE ESTIMATED VALUE

CORRECTION COEFFICIENT
401
461
462
410
420
FRAME PERIOD 1
FRAME PERIOD 2
SUBFRAME PERIOD 4
SUBFRAME PERIOD 1
SUBFRAME PERIOD 2
SUBFRAME PERIOD 3
SUBFRAME PERIOD 4
434
B1 B2 B3 B4
444
D1 D2 D3 D4
445
E1 D2 D3 D4
446
E1 E2 D3 D4
447
E1 E2 E3 D4
448
E1 E2 E3 E4
454
H1 H2 H3 H4
455
J1 H2 H3 H4
456
J1 J2 H3 H4
457
J1 J2 J3 H4
458
J1 J2 J3 J4
t

BACKLIGHT LUMINANCE ESTIMATED VALUE

BACKLIGHT LUMINANCE ESTIMATED VALUE

BACKLIGHT LUMINANCE ESTIMATED VALUE

BACKLIGHT LUMINANCE ESTIMATED VALUE

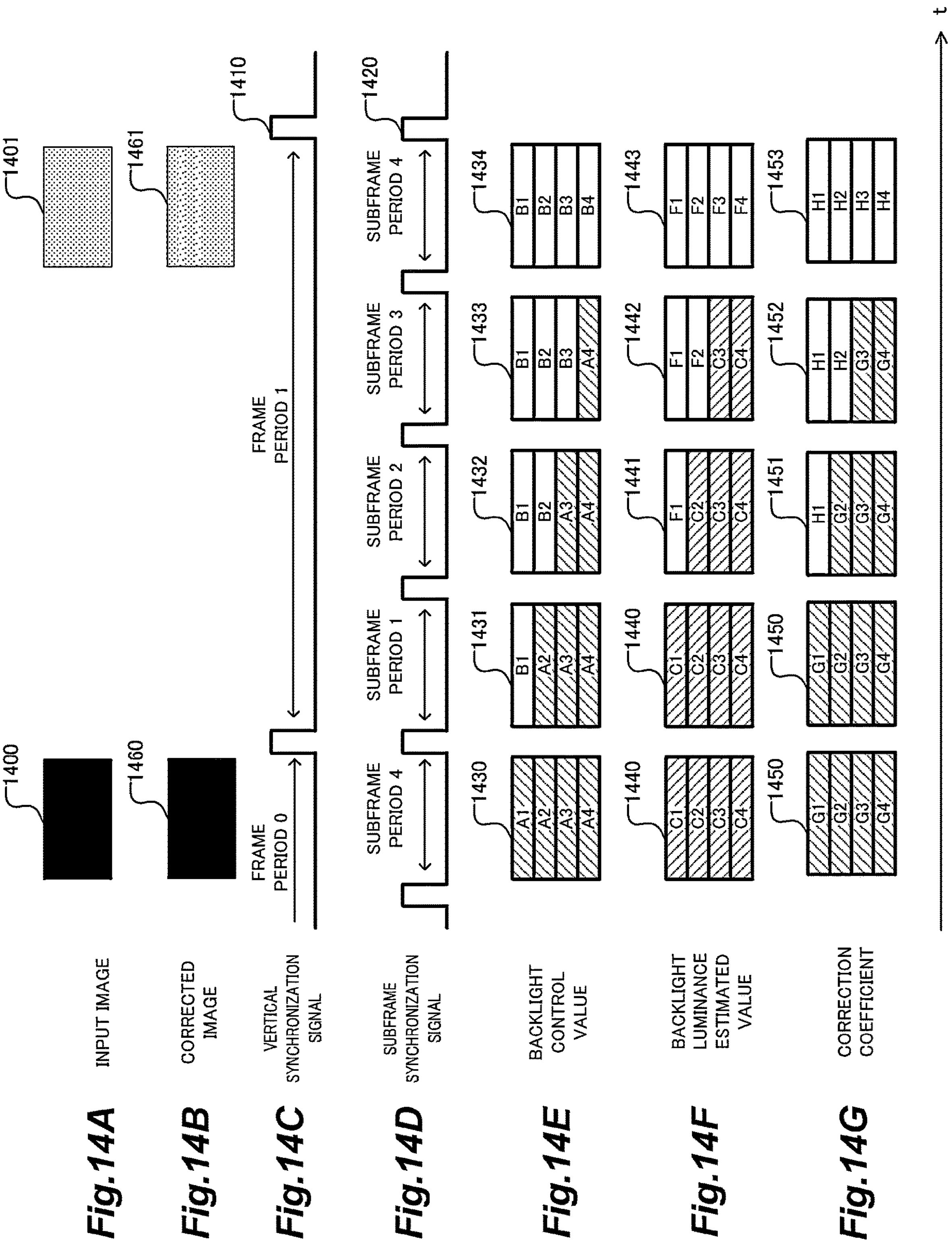
Fig.14A
INPUT IMAGE
1400
1401
Fig.14B
CORRECTED IMAGE
1460
1461
Fig.14C
VERTICAL SYNCHRONIZATION SIGNAL
FRAME PERIOD 0
FRAME PERIOD 1
1410
Fig.14D
SUBFRAME SYNCHRONIZATION SIGNAL
SUBFRAME PERIOD 4
SUBFRAME PERIOD 1
SUBFRAME PERIOD 2
SUBFRAME PERIOD 3
SUBFRAME PERIOD 4
1420
Fig.14E
BACKLIGHT CONTROL VALUE
1430
A1 A2 A3 A4
1431
B1 A2 A3 A4
1432
B1 B2 A3 A4
1433
B1 B2 B3 A4
1434
B1 B2 B3 B4
Fig.14F
BACKLIGHT LUMINANCE ESTIMATED VALUE
1440
C1 C2 C3 C4
1440
C1 C2 C3 C4
1441
F1 C2 C3 C4
1442
F1 F2 C3 C4
1443
F1 F2 F3 F4
Fig.14G
CORRECTION COEFFICIENT
1450
G1 G2 G3 G4
1450
G1 G2 G3 G4
1451
H1 G2 G3 G4
1452
H1 H2 G3 G4
1453
H1 H2 H3 H4
t

DISPLAY DEVICE WITH VARIABLE EMISSION LUMINANCE FOR INDIVIDUAL DIVISION AREAS OF BACKLIGHT, CONTROL METHOD OF A DISPLAY DEVICE, AND NON-TRANSITORY COMPUTER-READABLE MEDIUM

BACKGROUND OF THE INVENTION

Field of the Invention

The present invention relates to a display device with variable emission luminance for individual division areas of a backlight, a control method of a display device, and a non-transitory computer-readable medium.

Description of the Related Art

Implementation of high contrast of a display device displaying an image having a relatively wide dynamic range called a high dynamic range (HDR) image or the like has been requested. As representative display devices, there are an organic light emitting diode (OLED) display device, a liquid crystal display device (LCD device), and the like. While an organic electroluminescence (EL) element emits light for each pixel in the OLED display device, a liquid crystal panel adjusts an amount of transmission of light emitted from a backlight module for each pixel in the LCD device. In the LCD device, light emitted from a backlight module cannot be completely blocked, and thus black floating due to light leakage occurs. For this reason, contrast of display of the LCD device tends to be lower than that of the OLED display device that is a self-emission display device.

As a technology for improving contrast by reducing black floating in the LCD device, there is a technology called local dimming. In local dimming, by controlling emission luminance of a backlight module for each division area and correcting an image of a part corresponding to a division area for which emission luminance has been reduced, a reduction in display luminance of the image is compensated for.

In Japanese Translation of PCT Application No. 2012-505435, a technology for applying a weight filter to emission luminance of division areas of a backlight module, calculating a luminance distribution of a backlight emitted to an LCD panel, and correcting an input image on the basis of the calculated luminance distribution is described.

By increasing the number of division areas of a backlight module in local dimming, black floating is reduced more effectively, and the contrast can be improved. However, in a control method disclosed in Japanese Translation of PCT Application No. 2012-505435, in a case in which the number of division areas of the backlight module is increased, the amount of calculation of a luminance distribution of a backlight and the number of estimation points for calculating calculation amount backlight luminance need to be increased as well.

In addition, in the method disclosed in the Japanese Translation of PCT Application No. 2012-505435, in order to calculate a backlight luminance of the whole screen, a product-sum operation (application of a weight filter) is performed for each estimation point. For this reason, in the method disclosed in the Japanese Translation of PCT Application No. 2012-505435, in accordance with an increase in the number of division areas of the backlight, the amount of calculation of backlight luminance and thus an amount of calculation of image correction significantly increases, and there is a problem in that a processing delay and a circuit scale increase.

SUMMARY OF THE INVENTION

The present invention is a display device including:

a backlight consisting of a plurality of division areas of which emission luminance is variable for each division area;

a display panel of which transmittance of light emitted from the backlight is variable for each pixel;

one or more memories storing instructions; and one or more processors, the one or more processors executing the instructions to:

calculate emission luminance for each division area of the backlight on the basis of input image data;

calculate a correction value for correcting the input image data on the basis of the emission luminance;

correct the input image data on the basis of the calculated correction value; and control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image consists of a plurality of subframe periods, and the plurality of partial processes are sequentially performed by executing each partial process in each subframe period.

Further features of the present invention will become apparent from the following description of exemplary embodiments with reference to the attached drawings.

BRIEF DESCRIPTION OF THE DRAWINGS

FIGS. 4A to 4N are diagrams illustrating an example of changes in backlight control values, correction coefficients, and the like of Embodiment 1;

FIGS. 14A to 14G are diagrams illustrating an example of changes in backlight control values, correction coefficients, and the like of Embodiment 2;

DESCRIPTION OF THE EMBODIMENTS

Hereinafter, embodiments of the present invention will be described with reference to the drawings. The technical scope of the present invention is defined by the claims and is not limited by the embodiments illustrated below. Not all combinations of features described in the embodiment are essential to the present invention. Details described in this specification and the drawings are examples and do not limit the present invention. Various modifications can be made on the basis of the purpose of the present invention, and they are not excluded from the scope of the present invention. In other words, configurations acquired by combining each embodiment and a modified example thereof belong to the present invention as well.

Embodiment 1

Figure 1:
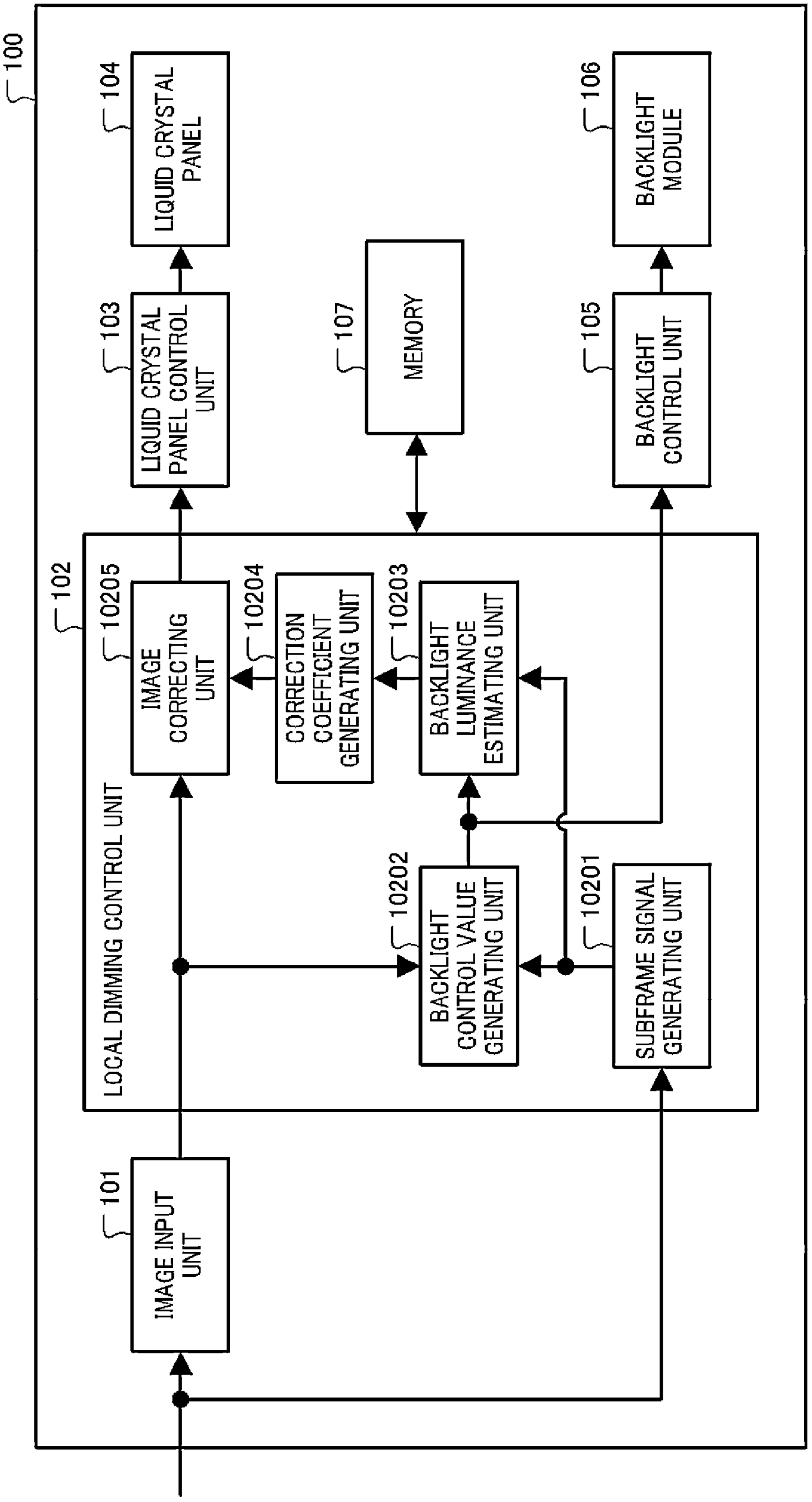
FIG. 1 is a block diagram illustrating functional blocks of a liquid crystal display device according to Embodiment 1.

Hereinafter, Embodiment 1 of the present invention will be described. FIG. 1 is a block diagram illustrating functional blocks of a liquid crystal display device 100 according to Embodiment 1. The liquid crystal display device 100 includes an image input unit 101, a local dimming control unit 102, a liquid crystal panel control unit 103, a liquid crystal panel 104, a backlight control unit 105, a backlight module 106, and a memory 107.

The image input unit 101 acquires image data (data of an image) from the outside. More specifically, the image input unit 101 includes an input interface such as a serial digital interface (SDI) and inputs image data to the liquid crystal display device 100 from the outside through the input interface. Then, the image input unit 101 performs a conversion process such as grayscale conversion or signal format conversion on the acquired (input) image data and outputs the image data after the conversion process.

The grayscale conversion, for example, is grayscale conversion using a one-dimensional lookup table (1D-LUT) and is grayscale conversion according to a gamma value (a panel gamma) of the liquid crystal panel 104. Here, a gamma characteristic (a correspondence relation between a grayscale value and luminance; a grayscale characteristic) of image data acquired from the outside is a linear characteristic in which the luminance linearly increases in accordance with an increase in the grayscale value, and a case in which a panel gamma is 2.0 will be assumed. In this case, grayscale conversion using an inverse gamma (that is, 1/2.0) of the panel gamma is performed. In accordance with this, acquired image data (image data having a linear characteristic) is converted into image data having a gamma characteristic in which the luminance is in proportion to a (1/2.0)-th power of a grayscale value. The conversion process performed by the image input unit 101 is not limited to the grayscale conversion using the 1D-LUT but may include a conversion process using a three-dimensional lookup table (3D-LUT), gain adjustment, offset adjustment, matrix conversion, and the like.

For example, the signal format conversion is a process of converting a signal format of image data from YCbCr, XYZ, or the like into RGB. The signal formats before and after conversion are not limited to YCbCr, XYZ, and RGB.

The local dimming control unit 102 includes a subframe signal generating unit 10201, a backlight control value generating unit 10202, a backlight luminance estimating unit 10203, a correction coefficient generating unit 10204, and an image correcting unit 10205. The local dimming control unit 102 inputs/outputs data and information to/from the memory 107 that is a storage means storing data and information.

The subframe signal generating unit 10201 generates a subframe synchronization signal from a vertical synchronization signal of image data input from the outside. In Embodiment 1, the subframe signal generating unit 10201 generates a subframe synchronization signal through four-fold multiplication of a vertical synchronization signal of input image data. For example, in a case in which a vertical synchronization signal of image data input from the outside is 60 Hz, the subframe signal generating unit 10201 generates a subframe synchronization signal of 240 Hz. Then, the subframe signal generating unit 10201 outputs the generated subframe synchronization signal. In accordance with this, one frame period is divided into a plurality of subframe periods. A division number of the subframe period will be denoted as M. In Embodiment 1, M=4 (see FIGS. 4B and 4C described below). The local dimming control unit 102 divides the process of calculating emission luminance of a plurality of division areas of the backlight module 106 and correction coefficients used for correcting input image data into a plurality of partial processes, which will be described in detail below. Then, the local dimming control unit 102 sequentially performs the plurality of partial processes in each of a plurality of subframe periods into which one frame period of input image data is divided.

The backlight control value generating unit 10202 generates (calculates) a backlight control value used for controlling the backlight module 106 on the basis of image data (input image data; data of an input image) output from the image input unit 101.

The backlight module 106 has light emission controlled by the backlight control unit 105 and emits light with emission luminance corresponding to a backlight control value input to the backlight control unit 105. In addition, in the backlight module 106, as illustrated in FIG. 2B, a plurality of division areas configuring a display surface are set in advance. The backlight module 106 has a plurality of light sources corresponding to the plurality of division areas and can change (can control) emission luminance for each division area. The light sources of the backlight module 106 are not particularly limited and, for example, are light emitting diodes (LED).

The backlight control value generating unit 10202 is a calculation means that calculates emission luminance of each division area of the backlight module 106 on the basis of input image data. In Embodiment 1, the backlight control value generating unit 10202 generates a backlight control value used for controlling emission of a light source of each division area of the backlight module 106 on the basis of input image data. The backlight control value generating unit 10202 determines a backlight control value of each division area in accordance with a characteristic quantity (a statistical quantity, for example, a maximum grayscale value or an average grayscale value) of image data of an area corresponding to the division area. Then, the backlight control value generating unit 10202 outputs the backlight control value in accordance with a subframe synchronization signal output from the subframe signal generating unit 10201.

Figure 2A:
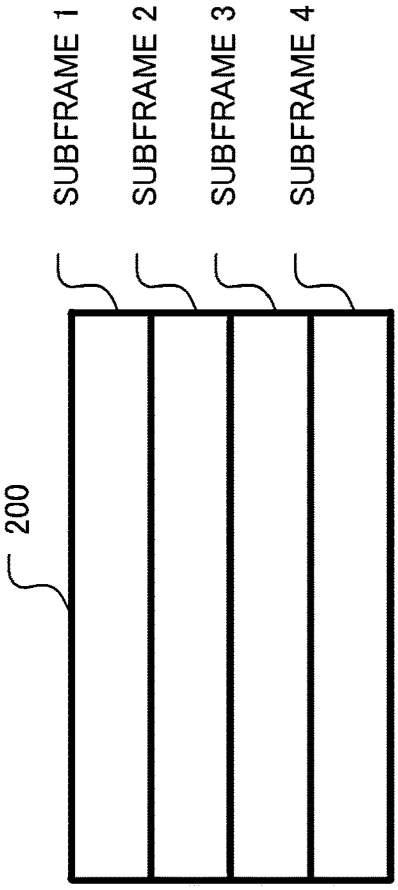
FIGS. 2A to 2C are diagrams illustrating an example of subframes, division areas, and subareas of a backlight according to Embodiment 1.
Figure 2B:
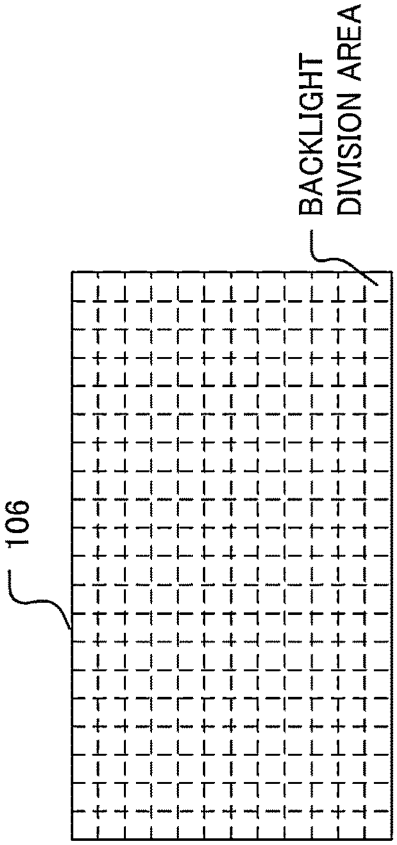
Figure 2C:
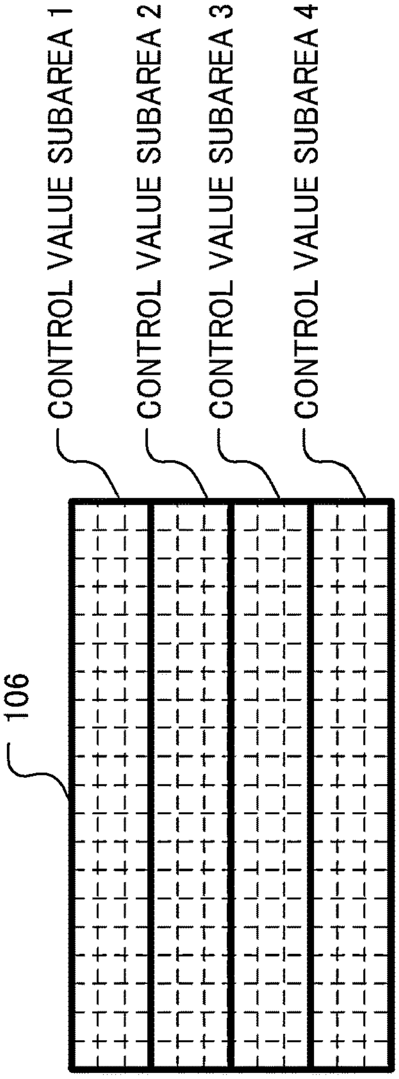

In Embodiment 1, as illustrated in FIG. 2A, a frame 200 of input image data is divided into a plurality of (M; M=4 in Embodiment 1) subframes in a vertical direction. Then, as illustrated in FIG. 2C, in correspondence with subframes 1 to 4, control value subareas 1 to 4 of the backlight module 106 that is a target for calculation of backlight control values in each subframe period are defined. In Embodiment 1, the control value subareas 1 to 4 are at the same positions as those of the subframes 1 to 4.

When a subframe synchronization signal of an N-th subframe period (N=1 to M; M=4 in Embodiment 1) is input, the backlight control value generating unit 10202 performs the following processes. In other words, the backlight control value generating unit 10202 calculates backlight control values of division areas included in the control value subarea N on the basis of image data of the subframe N. In each of the plurality of partial processes, the following processes performed by the backlight control value generating unit 10202 are included. In other words, the partial process includes a process of determining emission luminance of a division area of the backlight module 106 corresponding to each subframe on the basis of image data of each of a plurality of subframes into which input image data is divided.

The backlight control value generating unit 10202 performs the following process in each of a plurality of subframe periods. In other words, the backlight control value generating unit 10202 sequentially updates a backlight control value calculated in a previous frame period stored in the memory 107 with a backlight control value calculated in the current frame period. In each of the plurality of partial processes, the following process performed by the backlight control value generating unit 10202 is included. In other words, the partial process includes a process of determining emission luminance of a division area other than division areas of which emission luminance has been calculated until a current subframe period of a current frame period among a plurality of division areas on the basis of emission luminance calculated in the previous frame period that is stored in the memory 107. In addition, the backlight control value generating unit 10202 stores a backlight control value that has been calculated in the current frame period and used for updating a backlight control value of the previous frame in the memory 107. Then, the backlight control value generating unit 10202 combines the backlight control values calculated until the current subframe period of the current frame period with the backlight control values of the previous frame period, which have not yet been updated in the process of the current frame period, read from the memory 107. Then, the backlight control value generating unit 10202 generates backlight control values of the whole backlight module 106.

More specifically, the backlight control value generating unit 10202, in a subframe period N, reads backlight control values of control value subareas 1 to N−1 that have been calculated in subframe periods 1 to N−1 of the current frame period from the memory 107. In addition, the backlight control value generating unit 10202 reads backlight control values of control value subareas N+1 to M that have been calculated in subframe periods N+1 to M of the previous frame period from the memory 107. Then, the backlight control value generating unit 10202 combines the backlight control values of the control value subareas 1 to N−1 and N+1 to M that have been read from the memory 107 with the backlight control value of the control value subarea N calculated in the subframe period N of the current frame period. Then, the backlight control value generating unit 10202 generates backlight control values of the whole backlight module 106. In addition, the backlight control value generating unit 10202 updates the backlight control value of the control value subarea N, which has been calculated in the previous frame period, stored in the memory 107 with the backlight control value calculated in the subframe period N of the current frame period.

The backlight control value generating unit 10202 outputs the backlight control values of the whole backlight module 106 generated in this way to the backlight luminance estimating unit 10203.

In Embodiment 1, output of backlight control values to the backlight control unit 105 is performed only in the last subframe period M. In other words, at a time point at which the backlight control values of the whole backlight module 106 become backlight control values based on the image data of the current frame period, the backlight control values of the whole backlight module 106 are output to the backlight control unit 105. Thus, although update (calculation) of the backlight control value for each control value subarea included in the partial process is performed at 240 Hz, update of the actual emission state of the backlight module 106 is performed at 60 Hz.

The method for dividing a frame 200 of an input image into subframes is not limited to the example illustrated in FIG. 2A. In addition, the method for dividing the backlight module 106 into control value subareas is not limited to the example illustrated in FIG. 2C. Furthermore, a relation between a position of each subframe of the frame 200 and a position of a control value subarea of the backlight module 106 is not limited to the example described above.

Figure 3A:
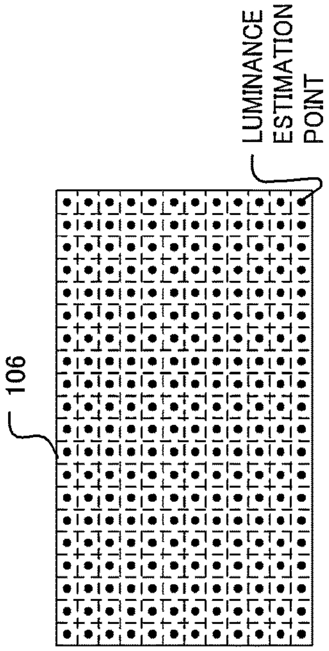
FIGS. 3A to 3E are diagrams illustrating an example of luminance estimation points of a backlight of Embodiment 1.

The backlight luminance estimating unit 10203 calculates an estimation value of luminance of light emitted from the backlight module 106 to the liquid crystal panel 104 (estimated value of backlight luminance; intensity) on the basis of the backlight control value output from the backlight control value generating unit 10202. The backlight luminance estimating unit 10203 calculates a backlight luminance estimated value on the basis of a backlight control value of each light source (each division area) and a luminance distribution model of light emitted from the light source (a part of the backlight module 106 that corresponds to the division area). Here, the backlight luminance estimating unit 10203 calculates a backlight luminance estimated value for each of luminance estimation points discretely disposed inside a display surface as illustrated in FIG. 3A. More specifically, the backlight luminance estimating unit 10203 calculates a backlight luminance estimated value L by performing a product-sum operation of a backlight control value $B_{ij}$ and a weight W u in accordance with the following Equation (1). In the following Equation (1), n represents a horizontal division number of the backlight module 106, and m represents a vertical division number of the backlight module 106. In addition, $B_{ij}$ is a backlight control value of a vertical position i; a horizontal position j, $W_{ij}$ is a weight applied to the backlight control value $B_{ij}$, and L represents a backlight luminance estimated value of a luminance estimation point. A luminance distribution model according to light of a light source turned on in each division area is assumed to be a distribution in which, the longer a distance from the light source, the more the luminance attenuates. Thus, the shorter the distance from a luminance estimation point, the larger the value of the weight W u applied to the backlight control value $B_{ij}$ set on the basis of this luminance distribution model.

[Math. 1]

$$L = \sum_{i=0}^{n}\sum_{j=0}^{m} W_{ij}B_{ij} \tag{1}$$

Figure 3B:
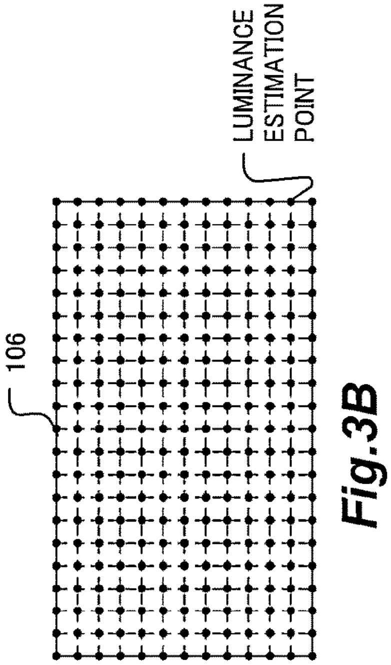
Figure 3C:
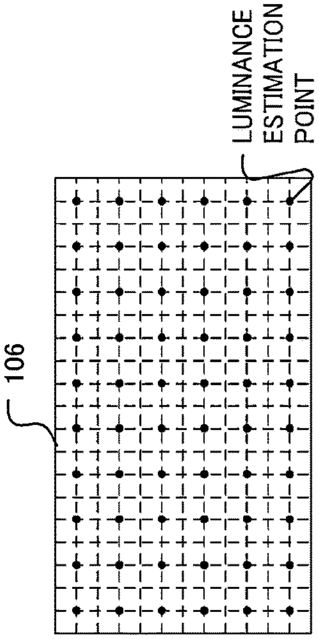

In the example illustrated in FIG. 3A, although one luminance estimation point is disposed in one division area of the backlight module 106, the disposition of the luminance estimation point is not limited thereto. For example, as illustrated in FIG. 3B, luminance estimation points may be disposed at four corners of a division area, or, as illustrated in FIG. 3C, one luminance estimation point may be disposed for four division areas. As will be described below, a correction coefficient for correcting a pixel located at a position of a luminance estimation point in input image data is calculated on the basis of a backlight luminance estimated value calculated for each luminance estimation point, and a correction coefficient applied to a pixel located at a position between luminance estimation points is calculated using an interpolation process. For this reason, in a case in which luminance estimation points are disposed as illustrated in FIG. 3B, the density of the luminance estimation points is higher than that illustrated in FIG. 3A, and thus interpolation error is suppressed, but the amount of calculation increases. On the other hand, in a case in which luminance estimation points are disposed as illustrated in FIG. 3C, the density of the luminance estimation points is lower than that illustrated in FIG. 3A, and thus, although the amount of calculation is suppressed, interpolation error increases. In addition, a backlight luminance estimated value of a position located between luminance estimation points may be calculated using an interpolation process on the basis of a backlight luminance estimated value calculated for each luminance estimation point, and the resolution of the backlight luminance estimated value may be scaled up to the resolution of the input image data. In such a case, although an interpolation process for scaling does not need to be performed for a correction coefficient, a relation between the density of luminance estimation points and a calculation amount and interpolation error becomes a relation similar to a case in which an interpolation process for scaling is performed for a correction coefficient.

Then, the backlight luminance estimating unit 10203 outputs the calculated backlight luminance estimated value in accordance with a subframe synchronization signal output from the subframe signal generating unit 10201.

Figure 3D:
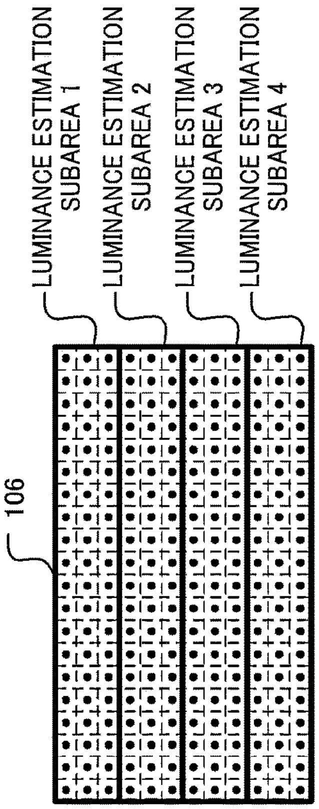
Figure 3E:
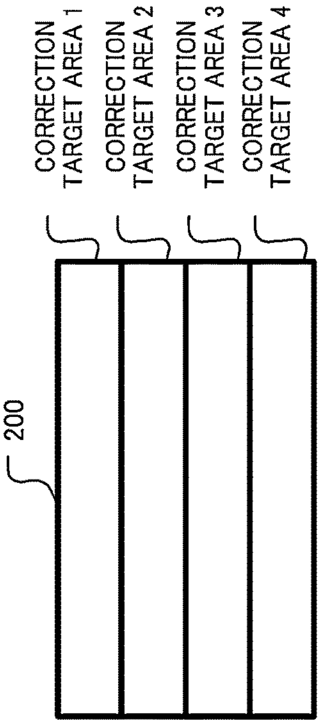

In Embodiment 1, as illustrated in FIG. 3E, the frame 200 of input image data is divided into a plurality of (M; M=4 in Embodiment 1) correction target areas in a vertical direction. A correction target area N (N=1 to M) is an area of input image data that is a target for calculating a correction coefficient in an N-th subframe period N. Then, as illustrated in FIG. 3D, in correspondence with a correction target area N, a luminance estimation subarea N of the backlight module 106 that is a target for calculating a backlight luminance estimated value in the subframe period N is defined. In Embodiment 1, the number of correction target areas is the same as the number of subframes illustrated in FIG. 2A. In addition, in the N-th subframe period, a position of the correction target area N that is a target for calculating correction coefficients and a position of the subframe N that is an image on which calculation of a backlight control value is based are the same. Thus, in the N-th subframe period, a position of a luminance estimation subarea N that is a target for calculating a backlight luminance estimated value and a position of a control value subarea N that is a target for calculating a backlight control value are the same. In Embodiment 1, positions of correction target areas 1 to 4 are respectively the same as positions of subframes 1 to 4, and positions of luminance estimation subareas 1 to 4 of the backlight module 106 are respectively the same as positions of control value subareas 1 to 4.

When a subframe synchronization signal of an N-th subframe period (N=1 to M; M=4 in Embodiment 1) is input, the backlight luminance estimating unit 10203 performs the following process. In other words, the backlight luminance estimating unit 10203 calculates a backlight luminance estimated value of a luminance estimation point included in the luminance estimation subarea N on the basis of the backlight control values of the whole backlight module 106 input from the backlight control value generating unit 10202. The backlight luminance estimating unit 10203 is a calculation means that performs a process of estimating a luminance distribution of light from the backlight module 106 emitted to the liquid crystal panel 104 on the basis of emission luminance determined by the backlight control value generating unit 10202. In each of the plurality of partial processes, a process of estimating a luminance distribution in each of a plurality of correction target areas using the backlight luminance estimating unit 10203 is included.

The correction coefficient generating unit 10204 is a calculation means that calculates a correction coefficient that is a correction value for correcting input image data output from the image input unit 101 on the basis of the backlight luminance estimated value output from the backlight luminance estimating unit 10203. In Embodiment 1, the correction coefficient generating unit 10204 calculates a correction coefficient Gt using a reciprocal of the backlight luminance estimated value L (a value normalized in the range of 0.0 to 1.0) in accordance with the following Equation (2). For example, in a case in which the backlight luminance estimated value is ⅓, the correction coefficient generating unit 10204 calculates a correction coefficient that corrects input image data to be a reciprocal number of times thereof, that is, three times thereof. By controlling transmittance of the liquid crystal panel 104 on the basis of the image data corrected using this correction coefficient, a decrease in display luminance according to a decrease in the backlight luminance can be compensated for. The method for calculating a correction coefficient is not limited to a reciprocal of the backlight luminance estimated value.

[Math. 2]

$$Gt = \frac{1}{L} \tag{2}$$

As illustrated in FIG. 3A, luminance estimation points are discretely disposed discretely with respect to a pixel array of input image data, and thus also a correction coefficient calculated on the basis of the backlight luminance estimated value is discrete with respect to the pixel array of the input image data. By calculating a correction coefficient used for correcting a pixel located at a position between luminance estimation points using an interpolation process based on a correction coefficient calculated on the basis of backlight luminance estimated values of luminance estimation points, the correction coefficient generating unit 10204 outputs a correction coefficient scaled to the resolution of the input image data. A method for scaling a correction coefficient, for example, is bi-cubic interpolation, bi-linear interpolation, or the like but is not limited to such a method as long as it can perform scaling to the resolution of input image data. In addition, the correction coefficient generating unit 10204 may calculate a correction coefficient on the basis of the backlight luminance estimated value scaled to the resolution of input image data by the backlight luminance estimating unit 10203. In such a case, calculation for scaling the correction coefficient becomes unnecessary.

The correction coefficient generating unit 10204, in the subframe period N, calculates a correction coefficient used for correcting image data of a correction target area N. In other words, the partial process includes a process of calculating a correction value used for correcting image data of each of a plurality of correction target areas into which input image data is divided by using the correction coefficient generating unit 10204. The correction coefficient generating unit 10204 calculates a correction coefficient of a correction target area N on the basis of a backlight luminance estimated value of a luminance estimation subarea N. In other words, the partial process includes a process of calculating a correction value used for correcting image data of each correction target area on the basis of a luminance distribution of each of a plurality of correction target areas estimated by the backlight luminance estimating unit 10203 using the correction coefficient generating unit 10204. The correction coefficient generating unit 10204 stores the calculated correction coefficient in the memory 107. The correction coefficient generating unit 10204, in the last subframe period M of the current frame period, calculates a correction coefficient of the correction target area M and then outputs correction coefficients of all the correction target areas 1 to M to the image correcting unit 10205. In other words, in Embodiment 1, output of correction coefficients of the whole frame to the image correcting unit 10205 is performed in the last subframe period M. In other words, at a time point at which correction coefficients based on input image data of the current frame period are calculated for the whole frame, the correction coefficients of the whole frame are output to the image correcting unit 10205. Thus, although update (calculation) of a correction coefficient for each subframe period (each correction target area) included in the partial process is performed at 240 Hz, update of a modulation state of actual transmitted light of the liquid crystal panel 104 is performed at 60 Hz.

The image correcting unit 10205 is a correction means that corrects input image data on the basis of correction values calculated by the correction coefficient generating unit 10204. In Embodiment 1, by multiplying pixel values of input image data output from the image input unit 101 by the correction coefficients output from the correction coefficient generating unit 10204, the image correcting unit 10205 generates (calculates) pixel values of corrected image data (data of a corrected image). In Embodiment 1, the image correcting unit 10205 multiplies RGB values (an R value, a G value, and a B value)=(Vr, Vg, Vb) that are pixel values of input image data by a correction coefficient Gt in accordance with the following Equation (3). In accordance with this, the image correcting unit 10205 calculates RGB values (Vrc, Vgc, Vbc) that are pixel values of the corrected image data. Then, the image correcting unit 10205 outputs the corrected image data.

[Math. 3]

$$Vrc = Vr \times Gt$$

$$Vgc = Vg \times Gt$$

$$Vbc = Vb \times Gt \quad (3)$$

The liquid crystal panel control unit 103 performs control of transmittance (a transmittance distribution inside the display surface) of the liquid crystal panel 104 on the basis of (in accordance with) corrected image data such that an image based on the corrected image data output from the image correcting unit 10205 is displayed on the liquid crystal panel 104.

The liquid crystal panel 104 is a display panel that is able to change transmittance of light emitted from the backlight module 106 for each pixel and displays an image on the display surface by having transmittance controlled by the liquid crystal panel control unit 103.

The backlight control unit 105 controls light emission of the backlight module 106 (a light source of the backlight module 106) on the basis of a backlight control value output from the backlight control value generating unit 10202. The backlight control unit 105, for example, determines a duty ratio of pulse width modulation (PWM) control in accordance with a backlight control value and controls emission luminance of the backlight module 106 using PWM control at the determined duty ratio. In Embodiment 1, the backlight control unit 105 performs such a process (control) for each division area.

The backlight module 106 emits light to a rear face of the liquid crystal panel 104. As described above, the emission luminance of the backlight module 106 can be changed. In Embodiment 1, a plurality of division areas configuring the display surface are set in advance, the backlight module 106 includes a plurality of light sources corresponding to the plurality of division areas, and emission luminance can be changed for each division area.

Referring to FIGS. 4A to 4N, 5A, 5B, 6A to 6D, 7A to 7H, 8A to 8D, and 9, an operation example of local dimming according to Embodiment 1 will be described.

FIGS. 4A to 4G illustrate an example of changes in an input image, a corrected image, a vertical synchronization signal, a subframe synchronization signal, a backlight control value, a backlight luminance estimated value, and a correction coefficient in frame periods 0 to 1 over time. FIGS. 4H to 4N illustrate an example of changes in an input image, a corrected image, a vertical synchronization signal, a subframe synchronization signal, a backlight control value, a backlight luminance estimated value, and a correction coefficient in frame periods 1 to 2 over time. A horizontal axis represents the time.

Figures 4H, 4I, 4J, 4K, 4L, 4M, 4N:
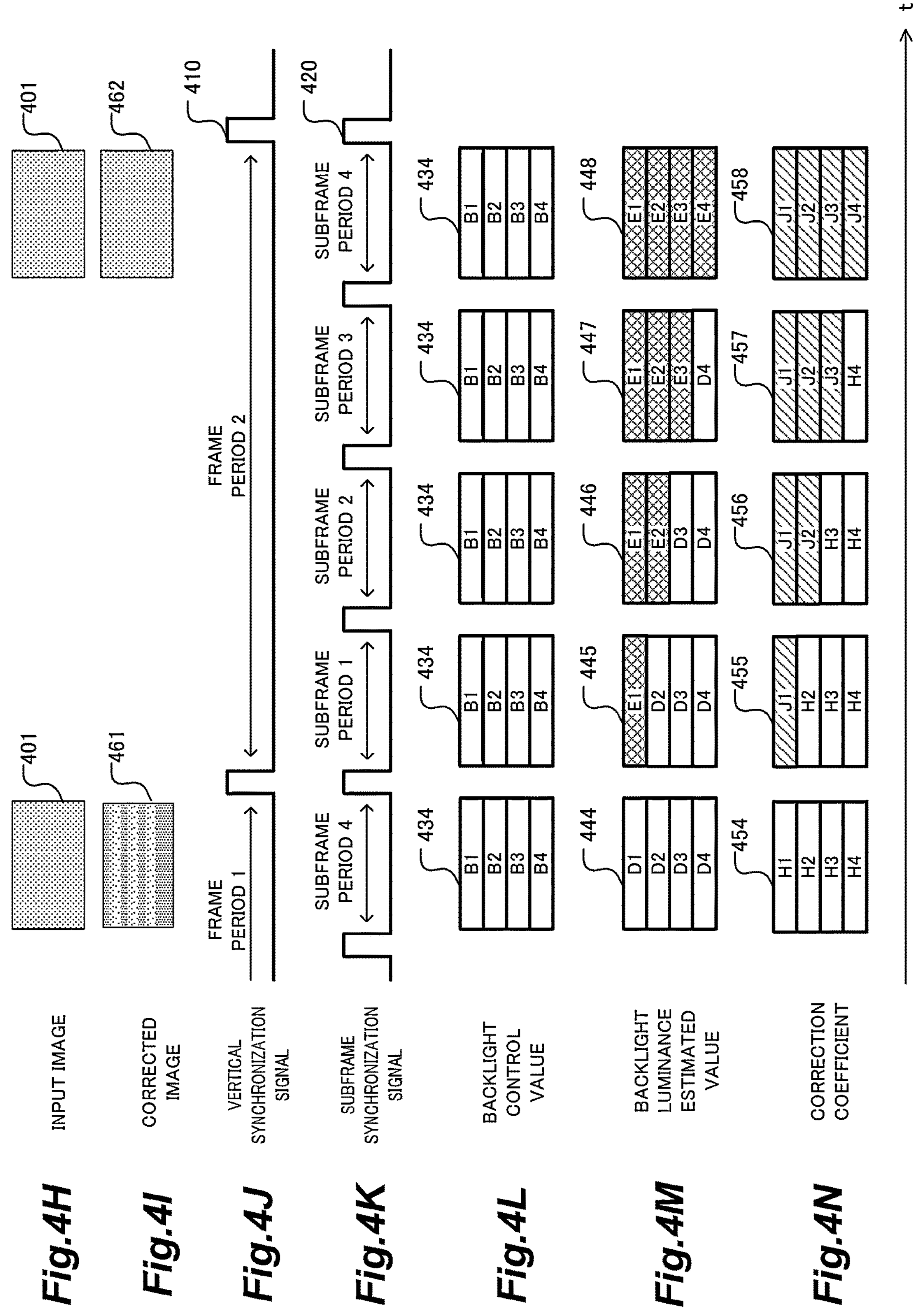

Each of the frame period 1 and the frame period 2 represented using the vertical synchronization signal 410 illustrated in FIGS. 4C and 4J is divided into four subframe periods (subframe periods 1 to 4) in accordance with the subframe synchronization signal 420 illustrated in FIGS. 4D and 4K.

Input images illustrated in FIGS. 4A and 4H are assumed to be switched from an input image 400 of the frame period 0 to an input image 401 in the frame period 1, and the input image 401 of the frame period 1 is maintained without any change in the frame period 2.

Figure 5A:
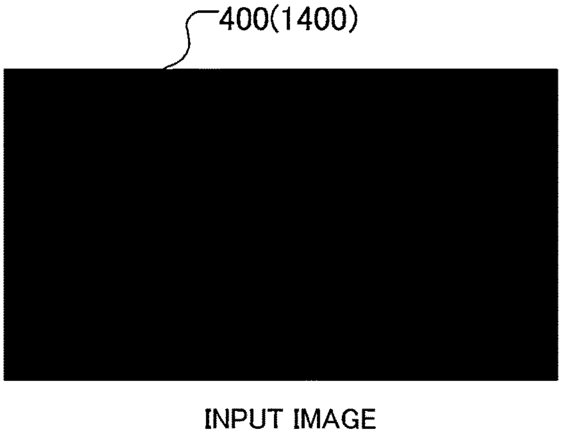
FIGS. 5A and 5B are diagrams schematically illustrating an example of input images of Embodiment 1.
Figure 5B:
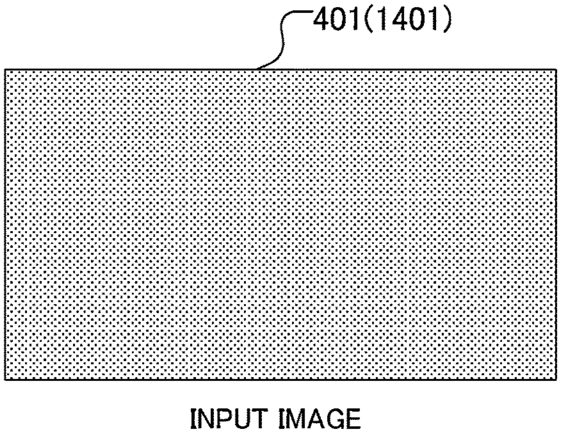

Here, FIGS. 5A and 5B are diagrams schematically illustrating an example of input images. In FIGS. 5A and 5B, a part of a heavy density represents a small grayscale value, and a part of a light density represents a large grayscale value. As illustrated in FIG. 5A, the input image 400 of the frame period 0 is assumed to be an image in which grayscale values (pixel values) of all the pixels are 0 (a 12-bit integer), and, as illustrated in FIG. 5B, the input image 401 of frame periods 1 and 2 is assumed to be an image in which grayscale values of all the pixels are 2048 (a 12-bit integer). Referring back to FIGS. 4A to 4N, backlight control values 430 to 433 illustrated in FIG. 4E include backlight control values A1 to A4 calculated on the basis of the input image 400. The backlight control values A1 to A4 are backlight control values of division areas included in control value subareas 1 to 4 of the backlight module 106 illustrated in FIG. 2C. In addition, backlight control values 431 to 434 illustrated in FIGS. 4E and 4L include backlight control values B1 to B4 calculated on the basis of the input image 401. The backlight control values B1 to B4 are backlight control values of division areas included in control value subareas 1 to 4 of the backlight module 106 illustrated in FIG. 2C.

As illustrated in FIG. 4E, in the frame period 1, the backlight control value is sequentially updated with the backlight control values 431 to 434 for every subframe period.

Backlight luminance estimated values illustrated in FIGS. 4F and 4M are estimated and calculated on the basis of the backlight control values illustrated in FIGS. 4E and 4L. Correction coefficients illustrated in FIGS. 4G and 4N are calculated on the basis of the backlight luminance estimated values illustrated in FIGS. 4F and 4M.

Hereinafter, an operation example of local dimming of the frame period 1 will be described.

Backlight control values 431 of the subframe period 1 of the frame period 1 are generated by updating a backlight control value A1 of the control value subarea 1 of the backlight module 106 among the backlight control values 430 of the frame period 0 with B1. The backlight control value A1 is a value that is calculated on the basis of the input image 400 in the previous frame period 0 and is stored in the memory 107. The backlight control value B1 is a value that has been calculated on the basis of image data of the subframe 1 of the input image 401 in the subframe period 1 of the current frame period 1.

Backlight luminance estimated values 441 of the subframe period 1 of the frame period 1 are generated by updating a backlight luminance estimated value C1 of the luminance estimation subarea 1 of the backlight module 106 among backlight luminance estimated values 440 of the frame period 0 with D1.

The backlight luminance estimated value C1 is a value that has been calculated in the previous frame period 0 and is stored in the memory 107, and the backlight luminance estimated value D1 is a value calculated on the basis of the backlight control value 431.

The calculated backlight luminance estimated value D1 is stored in the memory 107.

In addition, the backlight luminance estimated value 440 calculated in the frame period 0 is not used in the process of the frame period 1 and thus may not be stored in the memory 107. In such a case, the backlight luminance estimated value 441 includes a backlight luminance estimated value D1 of the luminance estimation subarea 1 and may not include backlight luminance estimated values C2 to C4 illustrated in FIG. 4F.

Correction coefficients 451 of the subframe period 1 of the frame period 1 are generated by updating a correction coefficient G1 of the correction target area 1 among correction coefficients 450 of the frame period 0 with H1. The correction coefficient G1 is a value that has been calculated in the previous frame period 0 and is stored in the memory 107. The correction coefficient H1 is a value that has been calculated on the basis of the backlight luminance estimated value D1 of the luminance estimation subarea 1 among backlight luminance estimated values 441. The calculated correction coefficient H1 is stored in the memory 107. The correction coefficient 450 calculated in the frame period 0 is not used in the process of the frame period 1 and thus may not be stored in the memory 107. In such a case, the correction coefficient 451 includes the correction coefficient H1 of the correction target area 1 and may not include correction coefficients G2 to G4 illustrated in FIG. 4G.

Here, FIGS. 6A to 6D are diagrams schematically illustrating an example of backlight control values. In FIGS. 6A to 6D, a part of a heavy density represents that it has a small backlight control value, and a part of a light density represents that it has a large backlight control value. FIGS. 7A to 7H are diagrams schematically illustrating an example of backlight luminance estimated values. In FIGS. 7A to 7H, a part of a heavy density represents that it has a small backlight luminance estimated value, and a part of a light density represents that it has a large backlight luminance estimated value.

Figure 6A:
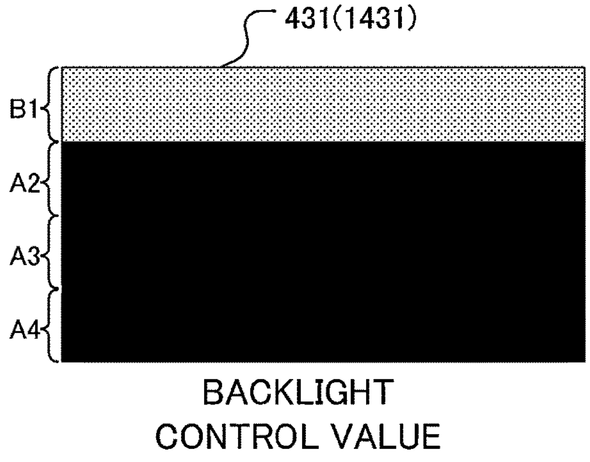
FIGS. 6A to 6D are diagrams schematically illustrating an example of backlight control values of Embodiment 1.
Figure 7A:
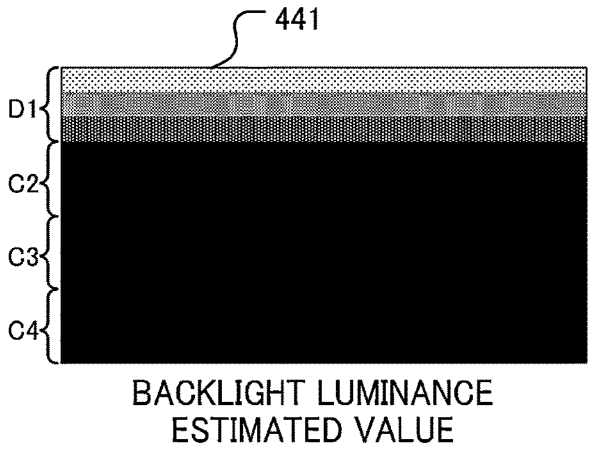
FIGS. 7A to 7H are diagrams schematically illustrating an example of backlight luminance estimated values of Embodiment 1.

As described above, the longer a distance from a light source, the more luminance of light from the light source turned on in a division area of the backlight module 106 attenuates. For this reason, in a case in which backlight luminance is estimated and calculated on the basis of a backlight control value, the shorter a distance from an estimated point of backlight luminance, the larger a weight applied to the backlight control value. In FIG. 6A, the backlight control value 431 of the subframe period 1 of the frame period 1 is schematically illustrated. As illustrated in FIG. 6A, among backlight control values 431 of the subframe period 1, backlight control values A2 to A4 of the control value subareas 2 to 4 are used by reading backlight control values calculated in the previous frame period 0 from the memory 107. The backlight control values A2 to A4 calculated in the previous frame period 0 are calculated on the basis of the input image 400 of the previous frame period 0 and are smaller than the backlight control value B1 calculated on the basis of the input image 401 of the current frame period 1. For this reason, as illustrated in FIG. 7A, as the area becomes closer to the control value subareas 2 to 4, the smaller the backlight luminance estimated value D1 of the luminance estimation subarea 1 becomes.

Figure 6B:
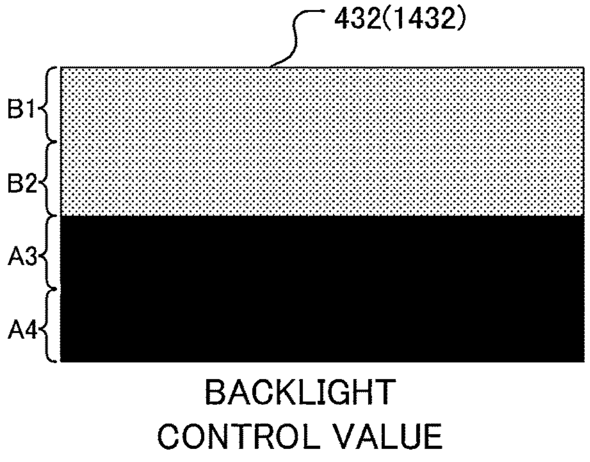

Backlight control values 432 of the subframe period 2 of the frame period 1 are generated by updating a backlight control value A2 of the control value subarea 2 of the backlight module 106 among the backlight control values 431 of the subframe period 1 with B2. The backlight control value A2 is a value that has been calculated in the previous frame period 0 and is stored in the memory 107, and the backlight control value B2 is a value that is calculated on the basis of image data of the subframe 2 in the input image 401. In FIG. 6B, the backlight control values 432 are schematically illustrated.

Figure 7B:
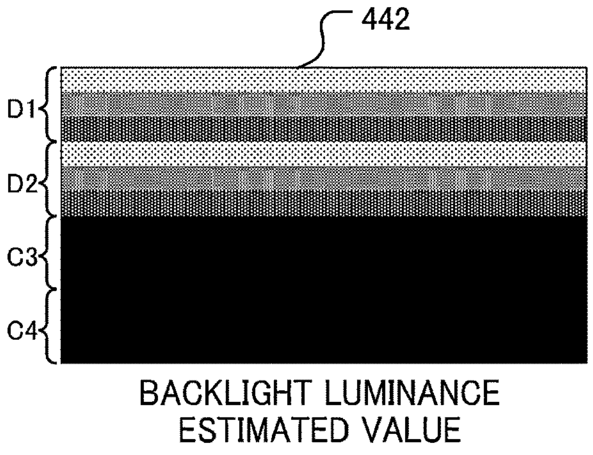

Backlight luminance estimated values 442 of the subframe period 2 of the frame period 1 are generated by updating a backlight luminance estimated value C2 of the luminance estimation subarea 2 of the backlight module 106 among backlight luminance estimated values 441 of the subframe period 1 with D2. The backlight luminance estimated value C2 is a value that has been calculated in the previous frame period 0 and is stored in the memory 107, and the backlight luminance estimated value D2 is a value calculated on the basis of the backlight control value 432. The calculated backlight luminance estimated value D2 is stored in the memory 107. Similar to the subframe period 1, as illustrated in FIG. 7B, as the subarea becomes closer to the control value subareas 3 and 4, the smaller the backlight luminance estimated value D2 of the luminance estimation subarea 2 becomes.

Correction coefficients 452 of the subframe period 2 of the frame period 1 are generated by updating a correction coefficient G2 of a correction target area 2 among correction coefficients 451 of the subframe period 1 with H2. The correction coefficient G2 is a value that has been calculated in the previous frame period 0 and is stored in the memory 107. The correction coefficient H2 is a value calculated on the basis of the backlight luminance estimated value D2 of the luminance estimation subarea 2 among backlight luminance estimated values 442. The calculated correction coefficient H2 is stored in the memory 107.

Figure 6C:
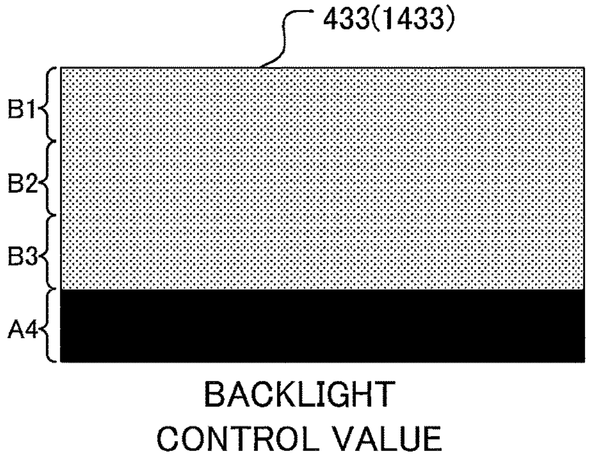

Backlight control values 433 of the subframe period 3 of the frame period 1 are generated by updating a backlight control value A3 of the control value subarea 3 of the backlight module 106 among backlight control values 432 of the subframe period 2 with B3. The backlight control value A3 is a value that has been calculated in the previous frame period 0 and is stored in the memory 107, and the backlight control value B3 is a value in the input image 401 that is calculated on the basis of image data of the subframe 3. FIG. 6C schematically illustrates the backlight control value 433.

Figure 7C:
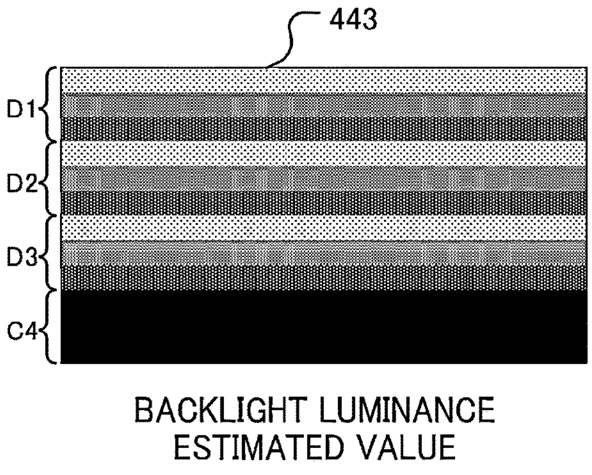

Backlight luminance estimated values 443 of the subframe period 3 of the frame period 1 are generated by updating a backlight luminance estimated value C3 of the luminance estimation subarea 3 of the backlight module 106 among backlight luminance estimated values 442 of the subframe period 2 with D3. The backlight luminance estimated value C3 is a value that has been calculated in the previous frame period 0 and is stored in the memory 107, and the backlight luminance estimated value D3 is a value calculated on the basis of the backlight control value 433. The calculated backlight luminance estimated value D3 is stored in the memory 107. Similar to the subframe period 1, as illustrated in FIG. 7C, as the subarea becomes closer to the control value subarea 4, the smaller the backlight luminance estimated value D3 of the luminance estimation subarea 3 becomes.

Correction coefficients 453 of the subframe period 3 of the frame period 1 are generated by updating a correction coefficient G3 of a correction target area 3 among correction coefficients 452 of the subframe period 2 with H3. The correction coefficient G3 is a value that has been calculated in the previous frame period 0 and is stored in the memory 107. The correction coefficient H3 is a value calculated on the basis of the backlight luminance estimated value D3 of the luminance estimation subarea 3 among backlight luminance estimated values 443. The calculated correction coefficient H3 is stored in the memory 107.

Figure 6D:
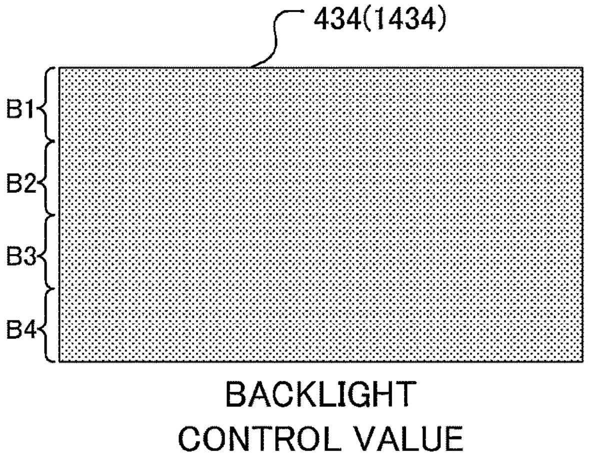

Backlight control values 434 of the subframe period 4 of the frame period 1 are generated by updating a backlight control value A4 of the control value subarea 4 of the backlight module 106 among backlight control values 433 of the subframe period 3 with B4. The backlight control value A4 is a value that has been calculated in the previous frame period 0 and is stored in the memory 107, and the backlight control value B4 is a value in the input image 401 that is calculated on the basis of image data of the subframe 4. The backlight control value 434 of the subframe period 4 is a value calculated on the basis of the input image 401 of the frame period 1 in all the control value subareas. As illustrated in FIG. 6D, when the backlight control values 434 are schematically illustrated, they are uniform inside the screen and become control values causing display luminance of the backlight of the inside of the screen to be uniform.

Figure 7D:
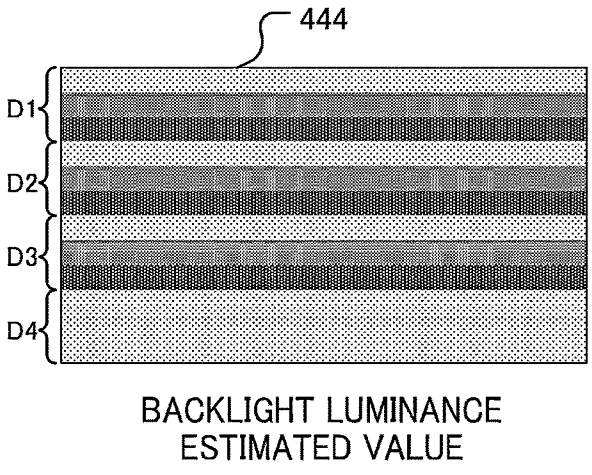

Backlight luminance estimated values 444 of the subframe period 4 of the frame period 1 are generated by updating a backlight luminance estimated value C4 of the luminance estimation subarea 4 of the backlight module 106 among backlight luminance estimated values 443 of the subframe period 3 with D4. The backlight luminance estimated value C4 is a value that has been calculated in the previous frame period 0 and is stored in the memory 107, and the backlight luminance estimated value D4 is a value calculated on the basis of the backlight control value 434. The calculated backlight luminance estimated value D4 is stored in the memory 107. Since the backlight control value 434 is a control value causing display luminance of the backlight inside the screen to be uniform, as illustrated in FIG. 7D, the backlight luminance estimated values D4 of the luminance estimation subarea 4 become uniform.

Correction coefficients 454 of the subframe period 4 of the frame period 1 are generated by updating a correction coefficient G4 of a correction target area 4 among correction coefficients 453 of the subframe period 3 with H4. The correction coefficient G4 is a value that has been calculated in the previous frame period 0 and is stored in the memory 107. The correction coefficient H4 is a value calculated on the basis of the backlight luminance estimated value D4 of the luminance estimation subarea 4 among backlight luminance estimated values 444. The calculated correction coefficient H4 is stored in the memory 107.

Figure 8A:
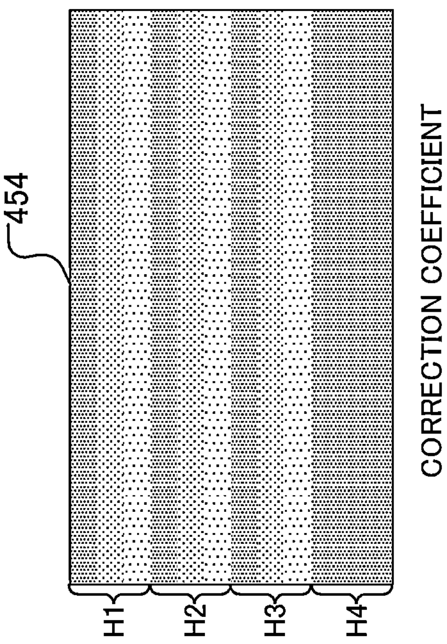
FIGS. 8A to 8D are diagrams schematically illustrating an example of image correction coefficients and corrected images of Embodiment 1.
Figure 8B:
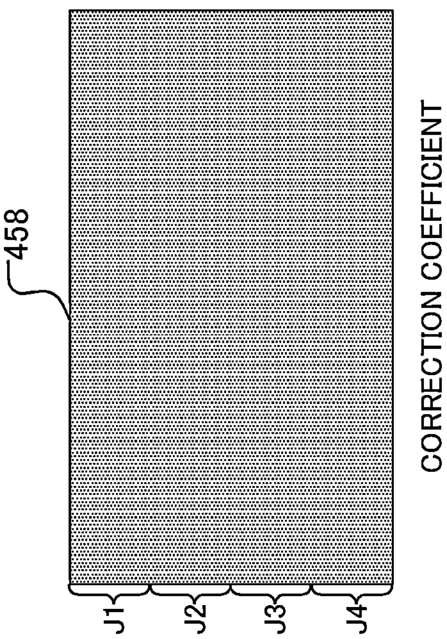
Figure 8C:
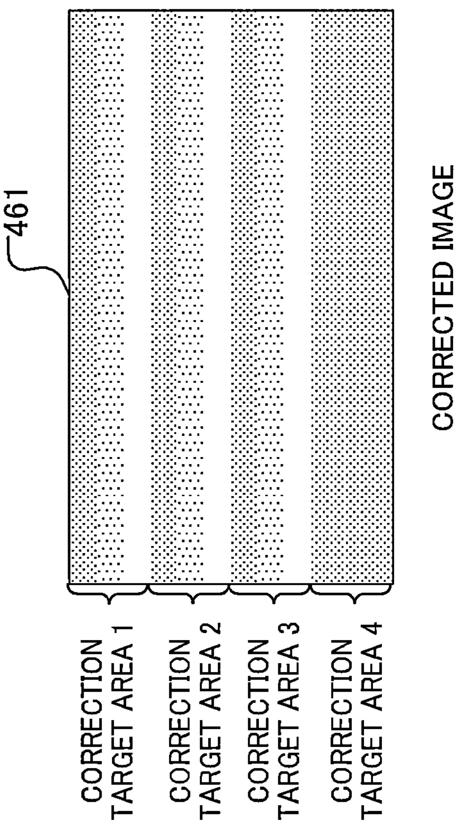
Figure 8D:
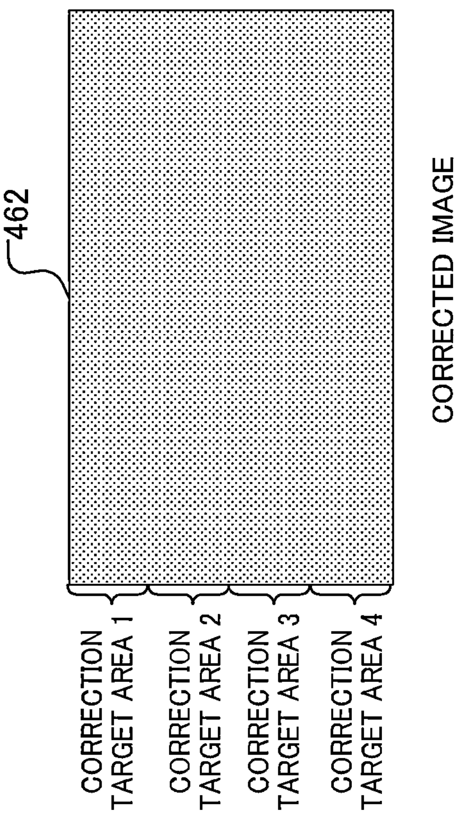

Here, FIGS. 8A to 8D are diagrams schematically illustrating an example of correction coefficients for correcting input image data and corrected images acquired by correcting the input image data using the correction coefficients. FIGS. 8A and 8B illustrate correction coefficients, each part of a heavy density represents that the correction coefficient is small, and each part of a light density represents that the correction coefficient is large. FIGS. 8C and 8D illustrate corrected images, each part of a heavy density represents that the pixel value is small, and each part of a light density represents that the pixel value is large.

In a frame period 1, in a last subframe period 4, a backlight control value 434, a backlight luminance estimated value 444, and a correction coefficient 454 are generated, and an input image 401 is corrected to be a corrected image 461 using the correction coefficient 454. More specifically, image data of correction target areas 1 to 4 in the input image 401 is corrected using correction coefficients H1 to H4. Then, the backlight control value 434 is output to the backlight control unit 105, and the backlight module 106 emits light on the basis of the backlight control value 434. In addition, the corrected image 461 is output to the liquid crystal panel control unit 103, and light from the backlight module 106 is modulated by the liquid crystal panel 104 on the basis of the corrected image 461.

As illustrated in FIG. 6D, the backlight control values 434 are control values causing display luminance of backlight inside the screen to be uniform. On the other hand, according to the backlight luminance estimated value 444, as illustrated in FIG. 7D, a difference in brightness and darkness occurs inside the screen. The correction coefficient is calculated on the basis of a reciprocal of a backlight luminance estimated value. Thus, as the correction coefficient 454 calculated on the basis of the backlight luminance estimated value 444, as illustrated in FIG. 8A, a correction coefficient of a pixel of which a backlight luminance estimated value is small is large, and a correction coefficient of a pixel of which a backlight luminance estimated value is large is small. In the frame period 1, the input image 401 illustrated in FIG. 5B is input. Thus, a corrected image 461 generated by multiplying image data of the input image 401 by the correction coefficient 454 in a subframe period 4 of the frame period 1, as illustrated in FIG. 8C, becomes an image in which there is a difference in brightness and darkness inside the screen. The backlight module 106 is controlled such that the backlight luminance of the inside of the screen becomes uniform in a subframe period 4 of the frame period 1, and thus, as illustrated in FIG. 8C, an image in which there is a difference in the brightness and darkness inside the screen is displayed on the liquid crystal panel 104.

Hereinafter, an operation example of local dimming of the frame period 2 will be described.

As described above, in the frame period 2, the input image has not been changed from the frame period 1. For this reason, in the frame period 2, as illustrated in FIG. 4L, the backlight control values are not changed with the backlight control values 434 calculated in the frame period 1 maintained.

Figure 7E:
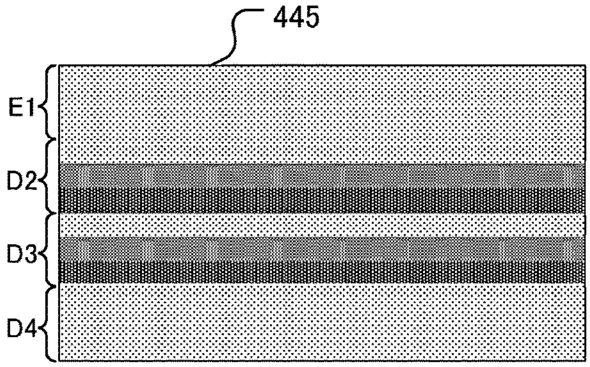

The backlight luminance estimated values 445 of a subframe period 1 of the frame period 2 are generated as below. A backlight luminance estimated value D1 of a luminance estimation subarea 1 of the backlight module 106 among backlight luminance estimated values 444 of a subframe period 4 of the frame period 1 is updated with E1. The backlight luminance estimated value D1 is a value that has been calculated in the previous frame period 1 and is stored in the memory 107, and the backlight luminance estimated value E1 is a value calculated on the basis of the backlight control value 434. The calculated backlight luminance estimated value E1 is stored in the memory 107. The backlight luminance estimated values 445 are schematically illustrated in FIG. 7E.

Correction coefficients 455 of the subframe period 1 of the frame period 2 are generated by updating a correction coefficient H1 of the correction target area 1 among correction coefficients 454 of the subframe period 4 of the frame period 1 with J1. The correction coefficient H1 is a value that has been calculated in the previous frame period 1 and is stored in the memory 107. The correction coefficient J1 is a value calculated on the basis of the backlight luminance estimated value E1 of the luminance estimation subarea 1 among backlight luminance estimated values 445. The calculated correction coefficient J1 is stored in the memory 107.

Figure 7F:
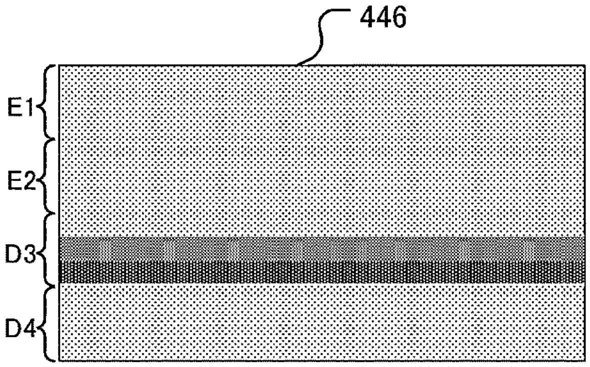

Backlight luminance estimated values 446 of a subframe period 2 of the frame period 2 are generated by updating a backlight luminance estimated value D2 of the luminance estimation subarea 2 of the backlight module 106 among backlight luminance estimated values 445 of the subframe period 1 with E2. The backlight luminance estimated value D2 is a value that has been calculated in the previous frame period 1 and is stored in the memory 107, and the backlight luminance estimated value E2 is a value calculated on the basis of the backlight control value 434. The calculated backlight luminance estimated value E2 is stored in the memory 107. The backlight luminance estimated values 446 are schematically illustrated in FIG. 7F.

Correction coefficients 456 of the subframe period 2 of the frame period 2 are generated by updating a correction coefficient H2 of the correction target area 2 among correction coefficients 455 of the subframe period 1 with J2. The correction coefficient H2 is a value that has been calculated in the previous frame period 1 and is stored in the memory 107. The correction coefficient J2 is a value calculated on the basis of the backlight luminance estimated value E2 of the luminance estimation subarea 2 among backlight luminance estimated values 446. The calculated correction coefficient J2 is stored in the memory 107.

Figure 7G:
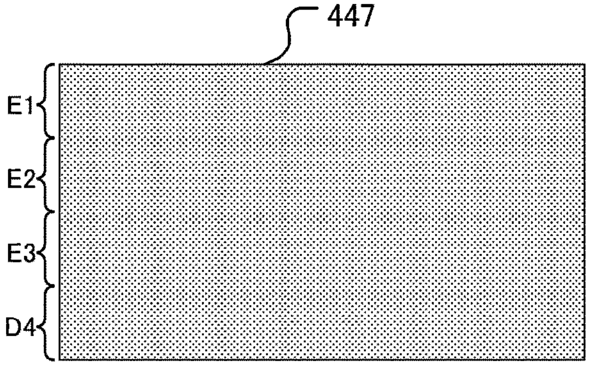

The backlight luminance estimated values 447 of a subframe period 3 during the frame period 2 are generated as below. A backlight luminance estimated value D3 of a luminance estimation subarea 3 of the backlight module 106 among backlight luminance estimated values 446 of the subframe period 2 is updated with E3. The backlight luminance estimated value D3 is a value that has been calculated in the previous frame period 1 and is stored in the memory 107, and the backlight luminance estimated value E3 is a value calculated on the basis of the backlight control value 434. The calculated backlight luminance estimated value E3 is stored in the memory 107. The backlight luminance estimated values 447 are schematically illustrated in FIG. 7G.

Correction coefficients 457 of the subframe period 3 of the frame period 2 are generated by updating a correction coefficient H3 of the correction target area 3 among correction coefficients 456 of the subframe period 2 with J3. The correction coefficient H3 is a value that has been calculated in the previous frame period 1 and is stored in the memory 107. The correction coefficient J3 is a value calculated on the basis of the backlight luminance estimated value E3 of the luminance estimation subarea 3 among backlight luminance estimated values 447. The calculated correction coefficient J3 is stored in the memory 107.

Figure 7H:
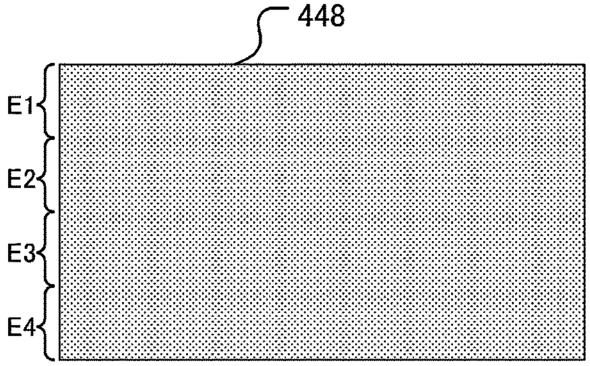

The backlight luminance estimated values 448 of a subframe period 4 during the frame period 2 are generated as below. A backlight luminance estimated value D4 of a luminance estimation subarea 4 of the backlight module 106 among backlight luminance estimated values 447 of the subframe period 3 is updated with E4. The backlight luminance estimated value D4 is a value that has been calculated in the previous frame period 1 and is stored in the memory 107, and the backlight luminance estimated value E4 is a value calculated on the basis of the backlight control value 434. The calculated backlight luminance estimated value E4 is stored in the memory 107. The backlight luminance estimated values 448 are schematically illustrated in FIG. 7H.

Correction coefficients 458 of the subframe period 4 of the frame period 2 are generated by updating a correction coefficient H4 of the correction target area 4 among correction coefficients 457 of the subframe period 3 with J4. The correction coefficient H4 is a value that has been calculated in the previous frame period 1 and is stored in the memory 107. The correction coefficient J4 is a value calculated on the basis of the backlight luminance estimated value E4 of the luminance estimation subarea 4 among backlight luminance estimated values 448. The calculated correction coefficient J4 is stored in the memory 107.

As above, in the frame period 2, the backlight control values 434, the backlight luminance estimated values 448, and the correction coefficients 458 are generated in the last subframe period 4, and the input image 401 is corrected to be a corrected image 462 using the correction coefficient 458. More specifically, image data of the correction target areas 1 to 4 in the input image 401 is corrected using the correction coefficients J1 to J4. Then, the backlight control values 434 are output to the backlight control unit 105, and the backlight module 106 emits light on the basis of the backlight control values 434. In addition, the corrected image 462 is output to the liquid crystal panel control unit 103, and the liquid crystal panel 104 modulates light from the backlight module 106 on the basis of the corrected image 462.

Figure 9:
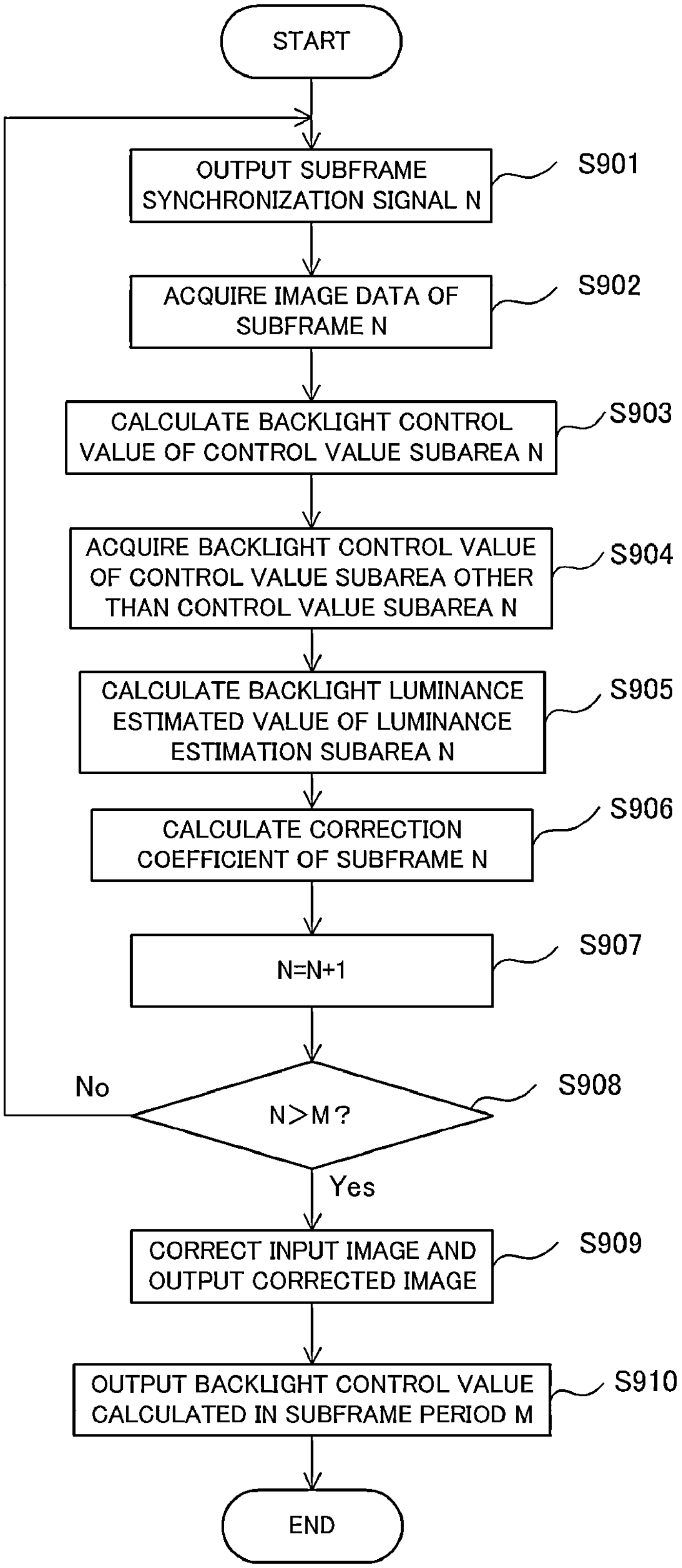
FIG. 9 is a flowchart illustrating the flow of local dimming control of Embodiment 1.

As illustrated in FIG. 6D, the backlight control values 434 are control values causing backlight luminance of the inside of the screen to be uniform. In addition, as illustrated in FIG. 7H, the backlight luminance estimated values 448 are uniform inside the screen. Each correction coefficient is generated on the basis of a reciprocal of a backlight luminance estimated value. Thus, as illustrated in FIG. 8B, the correction coefficients 458 generated on the basis of the backlight luminance estimated values 448 become uniform inside the screen. In a frame period 2, an input image 401 illustrated in FIG. 5B is input. Thus, a corrected image 462 generated by multiplying image data of the input image 401 by the correction coefficients 458 in the subframe period 4 of the frame period 2, as illustrated in FIG. 8D, becomes an image of which brightness is uniform inside the screen. Since the backlight module 106 is controlled such that the display luminance of the backlight of the inside of the screen becomes uniform in the subframe period 4 of the frame period 2, as illustrated in FIG. 8D, an image of which brightness is uniform inside the screen is displayed on the liquid crystal panel 104. FIG. 9 is a flowchart illustrating the flow of a process performed by the local dimming control unit 102 of the liquid crystal display device 100 of Embodiment 1. The process of this flowchart starts in accordance with reception of input of a vertical synchronization signal.

In Step S901, the subframe signal generating unit 10201 outputs an N-th subframe synchronization signal N (N=1 to M) of the current frame.

In Step S902, the backlight control value generating unit 10202 acquires image data of a subframe N in image data input from the image input unit 101.

In Step S903, the backlight control value generating unit 10202 calculates a backlight control value of the control value subarea N on the basis of image data of the subframe N.

In Step S904, the backlight control value generating unit 10202 reads backlight control values of control value subareas other than the control value subarea N that are stored in the memory 107. More specifically, for the control value subareas 1 to N−1, the backlight control value generating unit 10202 reads backlight control values that have been calculated in subframe periods 1 to N−1 of the current frame period and are stored in the memory 107. In addition, for the control value subareas N+1 to M, the backlight control value generating unit 10202 reads backlight control values that have been calculated in the previous frame period and are stored in the memory 107. Then, the backlight control value generating unit 10202 combines the backlight control value of the control value subarea N calculated in Step S903 and the backlight control values of the control value subareas 1 to N−1 and N+1 to M read from the memory 107. Then, the backlight control value generating unit 10202 generates and outputs backlight control values of the whole backlight module 106. In addition, the backlight control value generating unit 10202 stores the backlight control values of the control value subarea N calculated in Step S903 in the memory 107.

In Step S905, the backlight luminance estimating unit 10203 calculates a backlight luminance estimated value of the luminance estimation subarea N on the basis of the backlight control values of the whole backlight module 106.

In Step S906, the correction coefficient generating unit 10204 calculates a correction coefficient used for correcting image data of the correction target area N on the basis of the backlight luminance estimated value of the luminance estimation subarea N. The correction coefficient generating unit 10204 stores the calculated correction coefficient of the correction target area N in the memory 107.

In Step S907, the local dimming control unit 102 adds 1 to a counter N.

In Step S908, the local dimming control unit 102 determines whether the process of the last subframe period M has been completed. More specifically, the local dimming control unit 102 determines whether N>M.

In Step S908, in a case in which the local dimming control unit 102 determines that N≤M (Step S908: No), the subframe signal generating unit 10201 performs the process of Step S901. Thereafter, the processes of Steps S902 to S908 are repeated.

In Step S908, in a case in which the local dimming control unit 102 determines that N>M (Step S908: Yes), the image correcting unit 10205 performs a process of Step S909.

In Step S909, the image correcting unit 10205 corrects input image data using correction coefficients and outputs corrected image data to the liquid crystal panel control unit 103.

In Step S910, the backlight control value generating unit 10202 outputs backlight control values of the whole backlight module 106 to the backlight control unit 105.

As illustrated in this flowchart, in local dimming control of Embodiment 1, a partial process including calculation of a backlight control value of each control value subarea and a correction coefficient of each correction target area in each subframe period is performed (Steps S901 to S906). A plurality of partial processes are sequentially performed in each of a plurality of subframe periods. In the case of Embodiment 1, a partial process including calculation of backlight control values and correction coefficients of each subframe period is performed at 240 Hz that is the same as the frequency of the subframe synchronization signal. When calculation of the backlight control values of all the subframe periods and the correction coefficients of the correction target areas is completed, the backlight control values of the whole backlight module 106 and the correction coefficients of the whole frame are output. Then, display based on the corrected image data is performed (Steps S909 to Step S910). Thus, update of a display image of the liquid crystal panel 104 and the emission state of the backlight module 106 is performed at 60 Hz that is the same as the frequency of the vertical synchronization signal. In other words, the local dimming control unit 102 changes the transmittance of the liquid crystal panel 104 and light emission of the backlight module 106 for every frame period on the basis of emission luminance determined for each subframe period and correction values calculated for each subframe period.

Figures 10A, 10B, 10C:
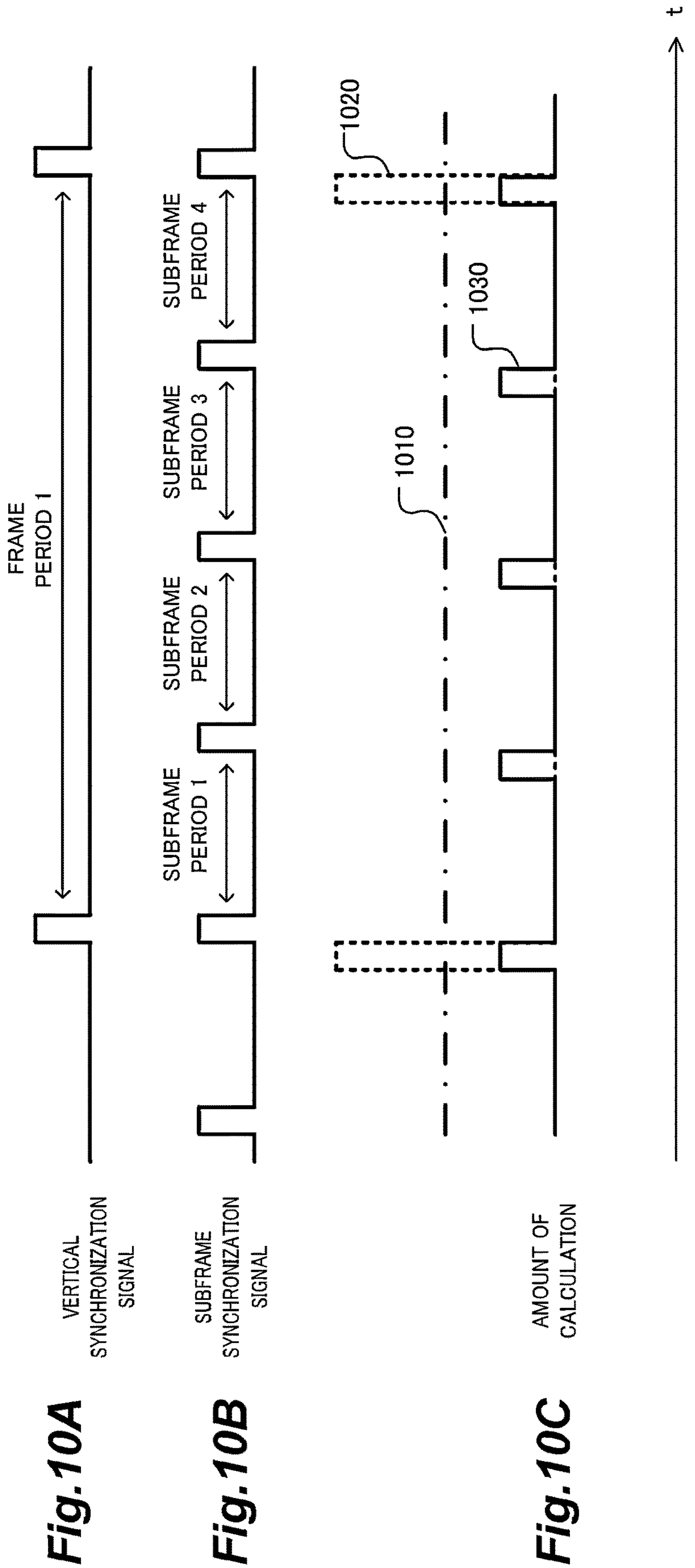
FIGS. 10A to 10C are diagrams illustrating an example of amounts of calculation of correction coefficients of Embodiment 1.
Figures 11A, 11B, 11C, 11D, 11E, 11F, 11G:
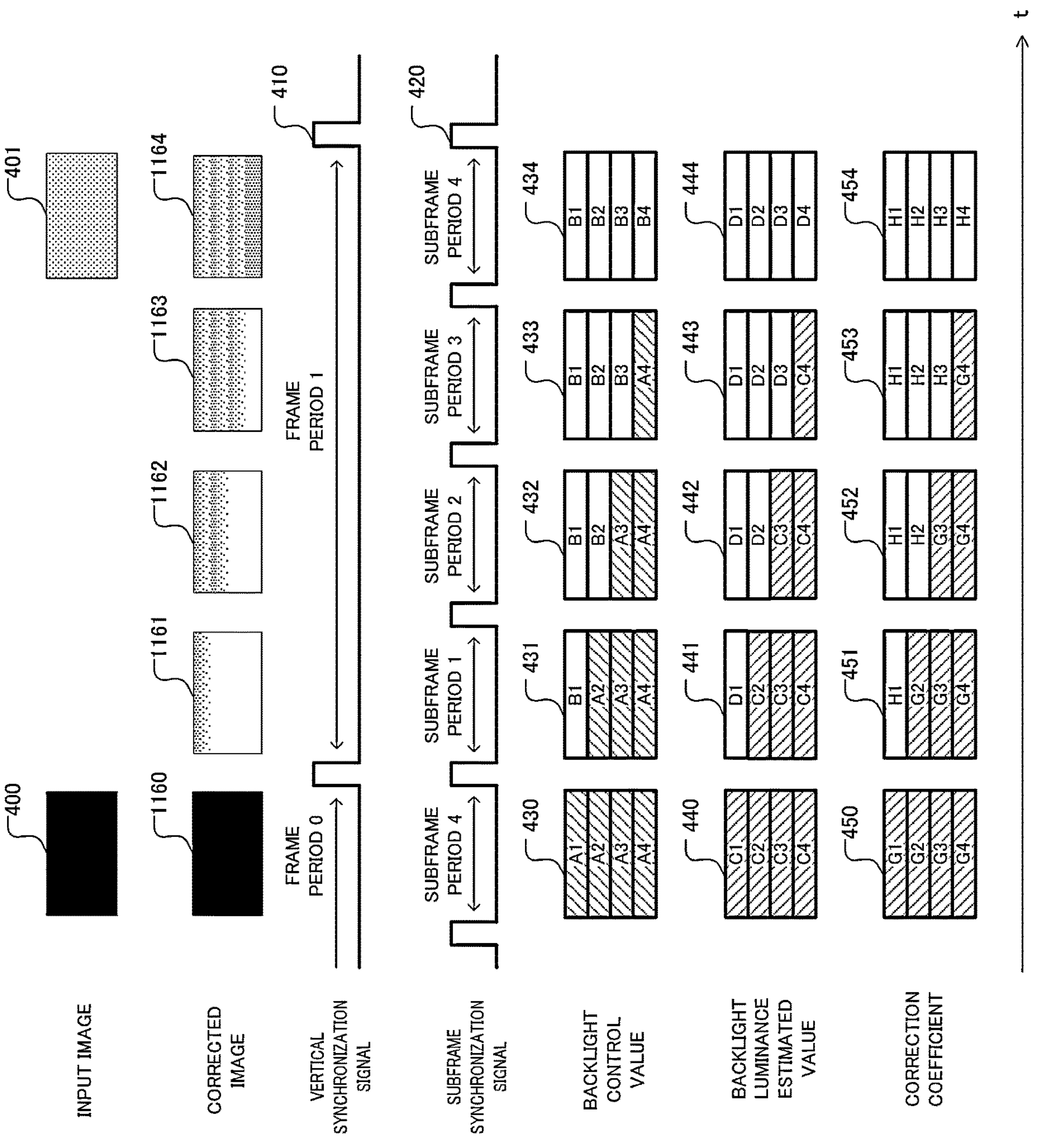
FIGS. 11A to 11G are diagrams illustrating an example of changes in backlight control values, correction coefficients, and the like of Modified Example 1 of Embodiment 1.

Referring to FIGS. 10A to 10C, effects of Embodiment 1 will be described. FIGS. 10A to 10C are diagrams illustrating an example of an amount of calculation of correction coefficients. FIGS. 10A to 10C respectively illustrate a vertical synchronization signal, a subframe synchronization signal, and a change in the amount of calculation over time. A horizontal axis represents the time.

In FIG. 10C, a threshold 1010 denoted by a dashed line represents an amount of calculation that can be calculated in one subframe period. The threshold 1010 may be also referred to as an amount of calculation of a process that can be performed using one synchronization signal as a trigger. A calculation amount 1020 denoted by a broken line represents an amount of calculation of a case in which backlight control values of the whole backlight module 106 and correction coefficients of the whole frames are calculated for every frame period. A calculation amount 1030 denoted by a solid line represents an amount of calculation of a case in which backlight control values of control value subareas and correction coefficients of correction target areas are calculated for every subframe period using the method of Embodiment 1.

The backlight control value generating unit 10202 calculates a backlight control value of each division area configuring a control value subarea of the backlight module 106 corresponding to a subframe on the basis of image data configuring the subframe in each subframe period. In each subframe period, for control value subareas other than the control value subareas for which backlight control values have been generated, the backlight control value generating unit 10202 uses backlight control values generated in the previous frame period or the previous subframe period. In accordance with this, while the amount of calculation per one partial process performed using one subframe synchronization signal as a trigger is suppressed, in each subframe period, backlight control values of the whole backlight module 106 can be generated. Compared to a case in which backlight control values of the whole backlight module 106 are generated on the basis of image data of the whole frame in each frame period using a frame synchronization signal as a trigger, the amount of calculation of the process performed using one synchronization signal as a trigger is reduced.

In addition, in each subframe period, the backlight luminance estimating unit 10203 calculates a backlight luminance estimated value of a luminance estimation subarea corresponding to a correction target area that corresponds to the subframe period on the basis of backlight control values of the whole backlight module 106. Compared to a case in which, in each frame period, backlight luminance estimated values of the whole backlight module 106 are calculated on the basis of backlight control values of the whole backlight module 106, the amount of calculation of the process performed using one synchronization signal as a trigger is reduced.

In addition, in each subframe period, the correction coefficient generating unit 10204 calculates a correction coefficient used for correcting image data of a correction target area on the basis of a backlight luminance estimated value of a luminance estimation subarea of the backlight module 106 corresponding to the correction target area. For correction target areas other than the correction target areas for which correction coefficients have been calculated, the correction coefficient generating unit 10204 uses correction coefficients calculated in the previous frame period or the previous subframe period. In accordance with this, while the amount of calculation per one partial process performed using one subframe synchronization signal as a trigger is suppressed, in each subframe period, correction coefficients of the whole frame can be generated. Compared to a case in which correction coefficients of the whole frame are calculated on the basis of backlight luminance estimated values of the whole backlight module 106 in each frame period using a frame synchronization signal as a trigger, the amount of calculation of the process performed using one synchronization signal as a trigger is reduced.

In this way, in local dimming control of Embodiment 1, calculation of backlight control values and correction coefficients is divided into a plurality of partial processes, and, in a plurality of respective subframe periods, the plurality of partial processes are sequentially performed. In accordance with this, calculation processes of the backlight control value generating unit 10202, the backlight luminance estimating unit 10203, and the correction coefficient generating unit 10204 are distributed in a plurality of partial processes, and the amount of calculation of a process performed using one synchronization signal as a trigger can be reduced.

In accordance with an increase in the number of division areas of the backlight module 106, the amount of calculation of backlight control values and correction coefficients increases. Depending on the number of division areas, as illustrated in FIG. 10C, there are cases in which the calculation amount 1020 of a case in which calculation of backlight control values and correction coefficients for each frame period is performed exceeds the threshold 1010 of the calculation amount of the process performed using one synchronization signal as a trigger. In such cases, delay of at least one frame occurs for backlight control values and correction coefficients based on an input image to be applied to actual display. In addition, in order to avoid delay, it is necessary to increase the circuit scale. Even for the number of division areas of such a backlight module 106, in the local dimming control of Embodiment 1, the process of calculation of backlight control values and correction coefficients is divided into a plurality of partial processes. Then, by sequentially performing the partial processes for every subframe period, the amount of calculation can be distributed, and the calculation amount 1030 of the partial processes performed using one synchronization signal as a trigger is reduced and can be caused not to exceed the threshold 1010. Thus, even when the number of division areas is increased, occurrence of a delay for backlight control values and correction coefficients corresponding to an input image to be applied to actual display can be inhibited. For this reason, the circuit scale does not need to be increased. According to Embodiment 1, the processing delay can be avoided. In addition, since a maximum value of the amount of calculation per unit period decreases, an increase in the circuit scale can be inhibited. In accordance with this, in local dimming, the number of division areas controlling backlights can be increased while a processing delay and an increase in the circuit scale are inhibited.

Modified Example 1

In Embodiment 1, the partial process including calculation of backlight control values and correction coefficients for every subframe period is performed at 240 Hz that is the same as the frequency of the subframe synchronization signal. On the other hand, update of the display image of the liquid crystal panel 104 and the emission state of the backlight module 106 is performed at 60 Hz that is the same as the frequency of the vertical synchronization signal. However, both the partial process including calculation of backlight control values and correction coefficients of every sub frame period and update of the display image of the liquid crystal panel 104 and the emission state of the backlight module 106 may be performed at 240 Hz that is the same as the frequency of the subframe synchronization signal. Hereinafter, Modified example 1 in which the display image of the liquid crystal panel 104 and the emission state of the backlight module 106 are changed to be updated in each subframe period in the liquid crystal display device 100 of Embodiment 1 will be described.

FIGS. 11A to 11G are diagrams illustrating changes of an input image, a corrected image, a vertical synchronization signal, a subframe synchronization signal, a backlight control value, a backlight luminance estimated value, and a correction coefficient in frame periods 0 to 1 over time in the liquid crystal display device 100 according to Modified example 1. FIGS. 11A to 11G are different from FIGS. 4A to 4G of Embodiment 1 only in a time change of a corrected image illustrated in FIG. 11B. In FIGS. 11A to 11G, the same reference signs as those illustrated in FIGS. 4A to 4N are assigned to elements common to those of Embodiment 1, and detailed description will be omitted.

Backlight control values 431 of a subframe period 1 of a frame period 1 is composed of a backlight control value B1 calculated on the basis of image data of the subframe 1 and backlight control values A2 to A4 calculated in a previous frame 0. Backlight luminance estimated values 441 are composed of a backlight luminance estimated value D1 calculated on the basis of the backlight control value 431 and backlight luminance estimated values C2 to C4 calculated in the previous frame 0. Correction coefficients 451 are composed of a correction coefficient H1 calculated on the basis of the backlight luminance estimated value D1 and correction coefficients G2 to G4 calculated in the previous frame period 0.

In Embodiment 1, an example in which the correction coefficients calculated in the previous frame period 0 are stored in the memory 107 has been described. In addition, the example in which, for the correction target areas 2 to 4 other than the correction target area 1 for which the correction coefficient has been calculated in the subframe period 1 of the frame period 1, correction coefficients 451 are generated using the correction coefficients stored in the memory 107 has been described. However, in Embodiment 1, a corrected image is not output for every subframe period, and thus the correction coefficients 451 do not need to include correction coefficients of the whole frame. Thus, in the case of Embodiment 1, the correction coefficients 451 do not need to include correction coefficients of the correction target areas 2 to 4, and correction coefficients calculated in the previous frame period 0 do not necessarily need to be stored in the memory 107 and used.

On the other hand, in Modified example 1, image correction of the whole frame is performed for every subframe period, and a corrected image is output, and thus the correction coefficients need to include correction coefficients of the whole frame in all the subframe periods. For this reason, in Modified example 1, a process of storing correction coefficients calculated in the previous frame period 0 in the memory 107 and using the stored correction coefficients is necessary. The correction coefficient generating unit 10204 outputs correction coefficients 451 of the whole frame generated in the subframe period 1 to the image correcting unit 10205. The image correcting unit 10205 corrects an input image 401 using the correction coefficients 451 and outputs a corrected image 1161 to the liquid crystal panel control unit 103. In addition, the backlight control value generating unit 10202 outputs backlight control values 431 generated in the subframe period 1 to the backlight control unit 105. In accordance therewith, the backlight module 106 emits light on the basis of the backlight control values 431, and the liquid crystal panel 104 modulates light from the backlight module 106 on the basis of the corrected image 1161, whereby image display is performed.

Subsequently, by using a similar process also in subframe periods 2 to 4, calculation and output of backlight control values and correction coefficients are performed for every subframe period. Then, display using the backlight module 106 and the liquid crystal panel 104 is updated at 240 Hz on the basis of corrected images 1162 to 1164.

Figure 12:
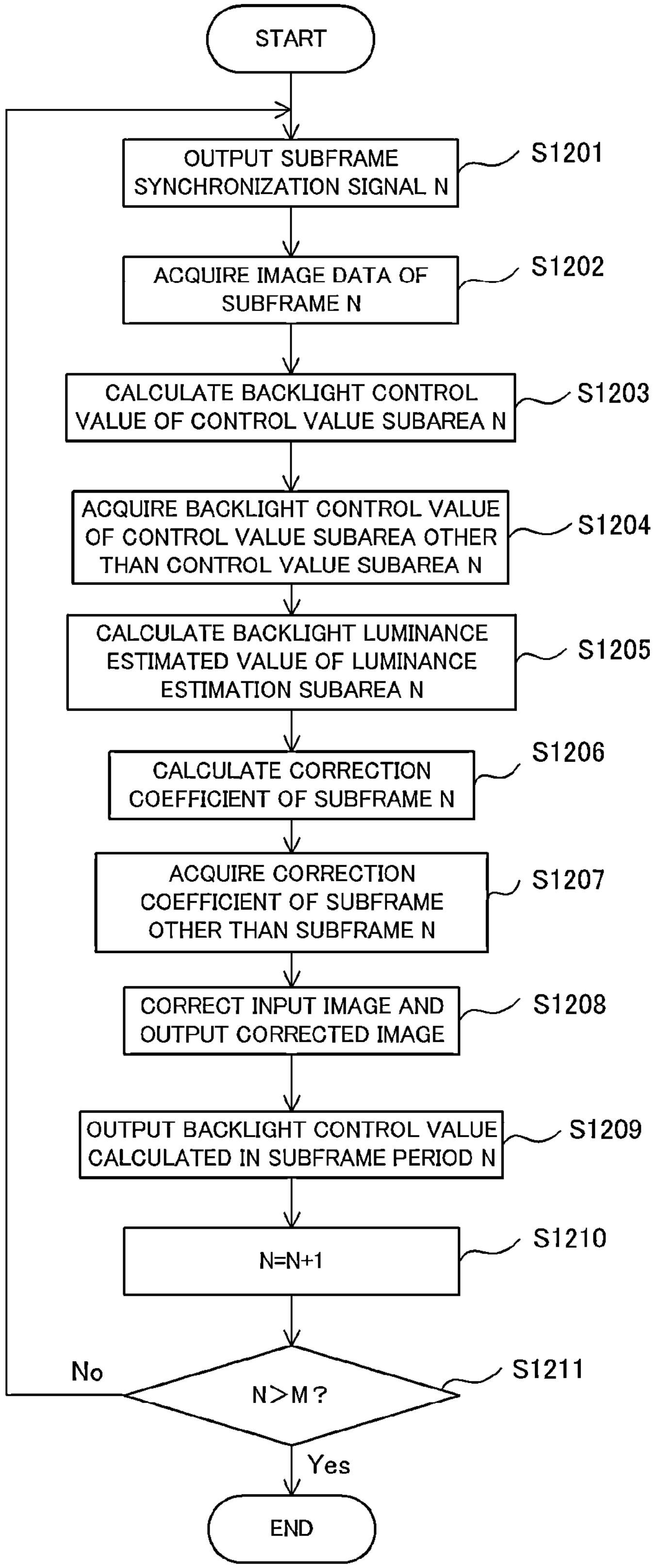
FIG. 12 is a flowchart illustrating the flow of local dimming control of Modified Example 1 of Embodiment 1.

FIG. 12 is a flowchart illustrating the flow of a process performed by a local dimming control unit 102 of a liquid crystal display device 100 according to Modified example 1. In the flowchart illustrated in FIG. 12, processes of Step S1201 to Step S1206 are similar to the processes of Step S901 to Step S906 of the flowchart of Embodiment 1 illustrated in FIG. 9, and thus description thereof will be omitted.

In Modified example 1, in Step S1206, the correction coefficient generating unit 10204 calculates correction coefficients of a correction target area N. Thereafter, in Step S1207, the correction coefficient generating unit 10204 reads correction coefficients of a correction target area other than the correction target area N stored in the memory 107. More specifically, for correction coefficients used for correcting image data of correction target areas 1 to N−1, the correction coefficient generating unit 10204 reads correction coefficients that have been calculated in subframe periods 1 to N−1 of the current frame period and are stored in the memory 107. In addition, for correction coefficients used for correcting image data of correction target areas N+1 to M, the correction coefficient generating unit 10204 reads correction coefficients that have been calculated in the previous frame period and are stored in the memory 107. Then, the correction coefficient generating unit 10204 generates correction coefficients of the whole frame by combining the correction coefficients of the correction target area N calculated in Step S1206 and the correction coefficients of the correction target areas 1 to N−1 and N+1 to M read from the memory 107 and outputs the generated correction coefficients. In addition, the correction coefficient generating unit 10204 stores the correction coefficients of the correction target area N calculated in Step S1206 in the memory 107.

In Step S1208, the image correcting unit 10205 corrects the input image data using the correction coefficients and outputs corrected image data to the liquid crystal panel control unit 103.

In Step S1209, the backlight control value generating unit 10202 outputs the backlight control values of the whole backlight module 106 to the backlight control unit 105.

Processes of Step S1210 to Step S1211 are similar to the processes of Step S907 to Step S908 of the flowchart of Embodiment 1 illustrated in FIG. 9.

As illustrated in this flowchart, in local dimming control of Modified example 1, calculation of backlight control values of control value subareas and correction coefficients of correction target areas is performed in each subframe period. In addition, while the backlight control values and the correction coefficients stored in the memory 107 are used, backlight control values of the whole backlight module 106 and correction coefficients of the whole frame are output. Then, display based on corrected image data is performed for every subframe period (Step S1201 to Step S1209). The partial process including calculation of backlight control values of control value subareas and correction coefficients of correction target areas and output for the backlight module 106 and the liquid crystal panel 104 is sequentially performed in each of a plurality of subframe periods. In the case of Modified example 1, the subframe synchronization signal is 240 Hz, and thus calculation of backlight control values and correction coefficients in every subframe is performed at 240 Hz that is the same as the frequency of the subframe synchronization signal. In addition, update of the display image of the liquid crystal panel 104 and the emission state of the backlight module 106 is performed also at 240 Hz that is the same as the frequency of the subframe synchronization signal. In other words, the local dimming control unit 102 changes the transmittance of the liquid crystal panel 104 and light emission of the backlight module 106 in every subframe period on the basis of emission luminance determined for every subframe period and correction values calculated in every subframe period.

Also in Modified example 1, by distributing the process of calculating backlight control values, backlight luminance estimated values, and correction coefficients in a plurality of partial processes, the amount of calculation of each partial process performed using one synchronization signal as a trigger can be suppressed. More specifically, backlight control values of control value subareas, backlight luminance estimated values of a luminance estimation subarea, and correction coefficients of correction target areas corresponding to each subframe period are calculated using calculation resources in each subframe period. Values of other backlight control values of control value subareas, backlight luminance estimated values of luminance estimation subareas, and correction coefficients of correction target areas that have already been calculated and are stored in the memory 107 are read and used. For this reason, while consumption of calculation resources is suppressed, backlight luminance estimated values of the whole backlight module 106, backlight luminance estimated values, and correction coefficients of the whole frame can be generated in every subframe period. Thus, also in Modified example 1, effects similar to those described with reference to FIGS. 10A to 10C of Embodiment 1 can be acquired.

As described above, in Embodiment 1, in a liquid crystal display device capable of changing emission luminance of the backlight module, by sequentially calculating image correction of local dimming in every subframe period, a calculation cost per one time can be reduced. For this reason, even when the number of division areas controlling backlight is increased, a processing delay and an increase in the circuit scale can be inhibited.

Embodiment 2

Hereinafter, Embodiment 2 of the present invention will be described. In Embodiment 1, there are cases in which luminance temporarily rises or falls in a partial area of a display image. In Embodiment 2, an example in which a temporary rise or fall of luminance occurring in a partial area of a display image is suppressed will be described. Although the configuration of a liquid crystal display device 100 according to Embodiment 2 is the same as that of the liquid crystal display device 100 illustrated in FIG. 1, the process of a backlight luminance estimating unit 10203 is partly different from that of the backlight luminance estimating unit described above. In Embodiment 2, reference signs and names used in Embodiment 1 will be used for components equivalent to those of Embodiment 1, and detailed description thereof will be appropriately omitted.

The backlight luminance estimating unit 10203 calculates an estimated value of luminance (a backlight luminance estimated value) of light emitted from a backlight module 106 to a liquid crystal panel 104 on the basis of a backlight control value output from a backlight control value generating unit 10202. Then, the backlight luminance estimating unit 10203 outputs the calculated backlight luminance estimated value in accordance with a subframe synchronization signal output from the subframe signal generating unit 10201. In Embodiment 2, a position of a luminance estimation subarea that is a target for calculation of a backlight luminance estimated value is different from a position of a control value subarea that is a target for updating a backlight control value in a subframe period, which is different from Embodiment 1. In other words, in Embodiment 2, positions of a subframe and a correction target area corresponding to each subframe periods are different from each other.

FIG. 13 is a diagram illustrating an example of a frame and subframes, division areas of the backlight module 106, control value subareas, luminance estimation points of a backlight, luminance estimation subareas, and correction target areas.

Figure 13A:
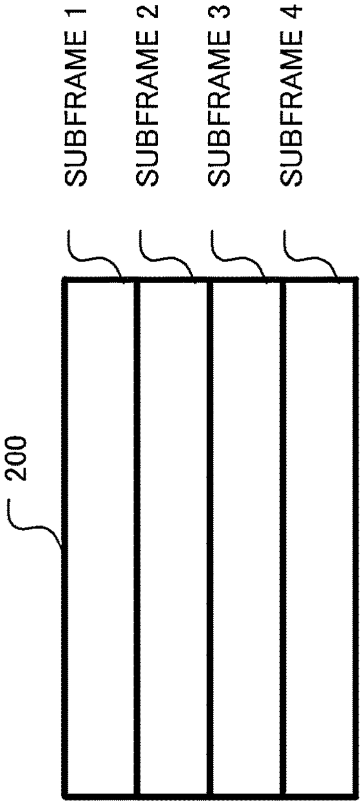
FIGS. 13A to 13D are diagrams illustrating an example of subframes, division areas and subareas of a backlight of Embodiment 2.
Figure 13B:
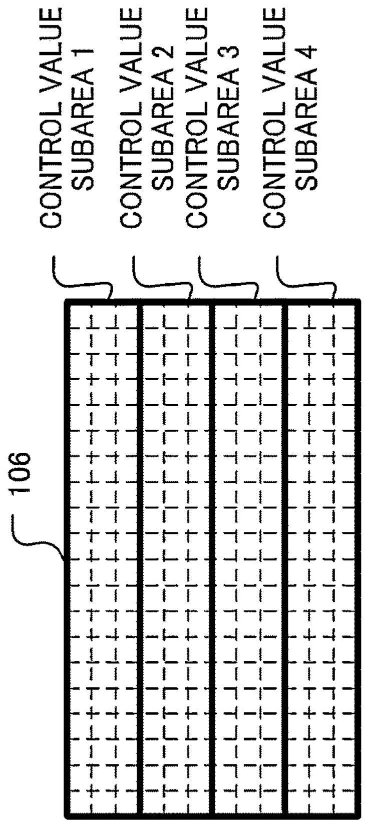

In Embodiment 2, as illustrated in FIG. 13A, a frame 200 of input image data is divided into a plurality of (M; M=4 in Embodiment 2) subframes in a vertical direction. As illustrated in FIG. 13B, control value subareas 1-4 of the backlight module 106 that are targets for calculation of backlight control values in each subframe period are defined respectively in correspondence with the subframes 1 to 4. In Embodiment 2, the control value subareas 1 to 4 are respectively at the same positions as those of the subframes 1 to 4. Calculation of a backlight control value of a control value subarea N in each subframe period N (N=1 to M) that is performed using the backlight control value generating unit 10202 according to Embodiment 2 is similar to that according to Embodiment 1. For example, in the subframe period N, the backlight control value generating unit 10202 calculates a backlight control value of the control value subarea N on the basis of image data of the subframe N. In addition, the backlight control value generating unit 10202 reads values that have been calculated on the basis of image data of a current frame period in previous subframe periods 1 to N−1 of a current frame period as backlight control values of control value subareas 1 to N−1 and are stored in the memory 107. Furthermore, the backlight control value generating unit 10202 reads values that have been calculated on the basis of image data of the previous frame period in the previous frame period as backlight control values of control value subareas N+1 to M and are stored in the memory 107. The backlight control value generating unit 10202 generates backlight control values of the whole backlight module 106 by combining these calculated backlight control values of the control value subarea N and the read backlight control values of the control value subareas 1 to N−1 and N+1 to M and outputs the generated backlight control values.

Figure 13C:
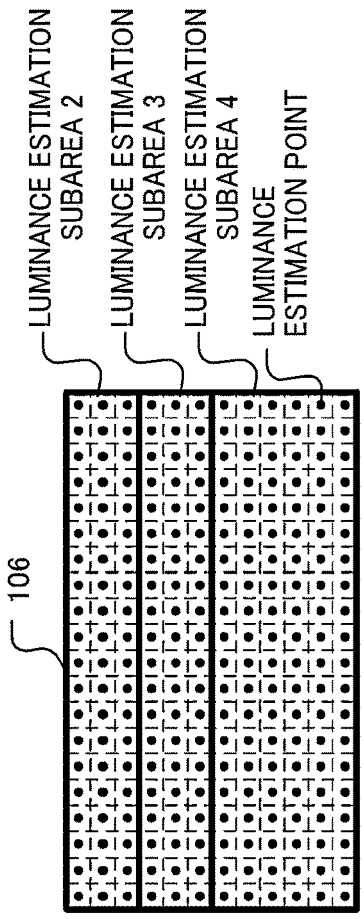
Figure 13D:
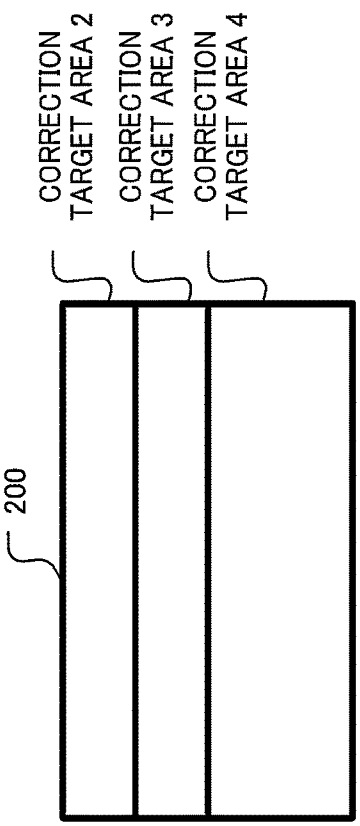

In Embodiment 2, as illustrated in FIG. 13D, the frame 200 of input image data is divided into a plurality of (M−k (1≤k<M); k=1, M=4 in Embodiment 2) correction target areas in a vertical direction. In the N (N=1 to k)-th subframe period, calculation of correction coefficients is not performed, and thus the correction target area N and the luminance estimation subarea N are not defined. In correspondence with a correction target area N that is a target for calculation of correction coefficients in the N-th (N=k+1 to M) subframe period, the luminance estimation subarea N of the backlight module 106 that is a target for calculation of backlight luminance estimated values is defined.

In Embodiment 2, as illustrated in FIGS. 13A and 13D, a subframe and a correction target area become targets for a partial process of every subframe period in order from the top in the frame 200 together. In the subframe period N (N=1 to k), only the subframe N is defined, and there is no correction target area. For this reason, although the subframe N that is a processing target in the subframe period N (N=k+1 to M) is located at the N-th position from the top in the frame 200, the correction target area N is located at the (N−k)-th position in the frame 200. Thus, in the subframe period N (N=k+1 to M), the position of the subframe N and the position of the correction target area N are different from each other. In the case of Embodiment 2, as illustrated in FIGS. 13A and 13D, the position of the correction target area N is upwardly separate from the position of the subframe N. Thus, as illustrated in FIGS. 13B and 13C, the position of the luminance estimation subarea N is upwardly separate from the position of the control value subarea N. In addition, in the subframe period N (N=1 to k), there is no correction target area N, and thus a positional relation between the correction target area N and the subframe N is not set.

Among backlight control values generated by the backlight control value generating unit 10202 in the subframe period N, the backlight control values of the control value subareas N+1 to M are values calculated on the basis of image data of the previous frame period in the previous frame period. As described above, in the subframe period N (N=k+1 to M), the luminance estimation subarea N is located at the (N−k)-th position from the top of the frame 200. On the other hand, the control value subarea N+1 that is the closest to the luminance estimation subarea N among control value subareas N+1 to M to which backlight control values calculated on the basis of image data of the previous frame period are applied is located at the (N+1)-th position from the top of the frame 200. Thus, in the subframe period N (N=k+1 to M), a division area located at the position of the correction target area N (a luminance estimation subarea N) and a division area of which emission luminance is determined on the basis of emission luminance calculated in the previous frame period (control value subareas N+1 to M) are not adjacent to each other. Since the luminance estimation subarea N and the control value subareas N+1 to M are separate by a predetermined distance or more, the influence of the backlight control value determined in the previous frame period on the backlight luminance estimated value can be reduced.

In Embodiment 2, k=1 and M=4, and, as illustrated in FIG. 13D, the number of correction target areas is 3, and, as illustrated in FIG. 13A, the number of subframes is 4. In Embodiment 2, calculation of correction coefficients is not performed in a subframe period N (N=1), but correction coefficients of correction target areas N (N=2 to 4) located at the (N−1)-th (1st to 3rd) positions from the top of the frame 200 are calculated in subframe periods N (N=2 to 4).

As illustrated in FIGS. 13A and 13C, a position of a correction target area N (N=2 to 4) for which correction coefficients are calculated in a subframe period N (N=2 to 4) is upwardly separate from the position of the subframe N (N=2 to 4). Thus, the position of a luminance estimation subarea N (N=2 to 4) for which a backlight luminance estimated value is calculated in the subframe period N (N=2 to 4) is upwardly separate from the position of the control value subarea N (N=2 to 4). Then, among backlight control values generated in the subframe period N, as backlight control values of the control value subareas N+1 to 4, values that have been calculated on the basis of image data of the previous frame period and are stored in the memory 107 are used. For example, among the backlight control values generated in the subframe period 2, backlight control values of the control value subareas 3 and 4 are values based on the image data of the previous frame period. However, the position of the luminance estimation subarea 2 in the subframe period 2 is upwardly separate from the control value subarea 2, and, naturally, the control value subareas 3 and 4 in which values calculated on the basis of the image data of the previous frame period are used are not adjacent to each other but are separate from each other by a predetermined distance or more. Thus, the influence of the backlight control value calculated on the basis of the image data of the previous frame period on the backlight luminance estimated value calculated for the luminance estimation subarea 2 can be suppressed. When a subframe synchronization signal corresponding to the N-th subframe period (N=k+1 to M; k=1 and M=4 in Embodiment 2) is input, the backlight luminance estimating unit 10203 performs the following process. In other words, the backlight luminance estimating unit 10203 calculates backlight luminance estimated values of luminance estimation points included in the luminance estimation subarea N on the basis of backlight control values of the whole backlight module 106 input from the backlight control value generating unit 10202. In addition, in the N-th subframe period (N=1 to k; k=1 in Embodiment 2), the backlight luminance estimating unit 10203 does not perform calculation of backlight luminance estimated values and correction coefficients. In other words, in the N-th subframe period N (N=1 to k; k=1 in Embodiment 2), there is no luminance estimation subarea that is a target for calculation of backlight luminance estimated values.

The correction coefficient generating unit 10204 calculates a correction coefficient in every subframe period using a process similar to that of Embodiment 1. Here, a correction target area N to which the correction coefficient calculated in the subframe period Nis applied is different from the subframe N, which is different from Embodiment 1. In Embodiment 1, as illustrated in FIGS. 2A and 3E, although the positions of the subframe N that is a processing target in each subframe period N and the correction target area N are the same, in Embodiment 2, as illustrated in FIGS. 13A and 13D, the positions thereof are difference from each other. For example, a correction coefficient calculated in the subframe period 2 is image data of the correction target area 2, and this is image data present at the position of the subframe 1. In addition, image data corrected using a correction coefficient calculated in the subframe period 4 is image data of the correction target area 4, and this is image data present at the positions of the subframes 3 and 4. In the subframe period 1, the correction coefficient generating unit 10204 does not perform calculation of a correction coefficient.

An operation example of local dimming according to Embodiment 2 will be described with reference to FIGS. 5A, 5B, 6A to 6D, 14A to 14G, 15A to 15D, 16A, and 16B.

FIGS. 14A to 14G illustrate an example of changes in an input image, a corrected image, a vertical synchronization signal, a subframe synchronization signal, a backlight control value, a backlight luminance estimated value, and a correction coefficient in frame periods 0 to 1 over time. A horizontal axis represents the time.

The frame period 1 represented using a vertical synchronization signal 1410 illustrated in FIG. 14C is divided into four subframe periods (subframe periods 1 to 4) in accordance with the subframe synchronization signal 1420 illustrated in FIG. 14D.

An input image illustrated in FIG. 14A is switched from an input image 1400 of the frame period 0 to an input image 1401 in the frame period 1. The input image 1400 of the frame period 0 is assumed to be an image in which grayscale values (pixel values) of all the pixels as illustrated in FIG. 5A described in Embodiment 1 are 0 (a 12-bit integer). The input image 1401 of the frame period 1 is assumed to be an image in which grayscale values of all the pixels as illustrated in FIG. 5B described in Embodiment 1 are 2048 (a 12-bit integer).

Backlight control values 1430 to 1433 illustrated in FIG. 14E include backlight control values A1 to A4 calculated on the basis of the input image 1400. The backlight control values A1 to A4 are backlight control values of division areas of control value subareas 1 to 4 of the backlight module 106 illustrated in FIG. 13B. In addition, backlight control values 1431 to 1434 include backlight control values B1 to B4 corresponding to the input image 1401. The backlight control values B1 to B4 are backlight control values of the division areas of the control value subareas 1 to 4 of the backlight module 106 illustrated in FIG. 13B.

As illustrated in FIG. 14E, in the frame period 1, the backlight control value is sequentially updated with the backlight control values 1431 to 1434 for every subframe period.

Backlight luminance estimated values illustrated in FIG. 14F are estimated and calculated on the basis of the backlight control values illustrated in FIG. 14E. Correction coefficients illustrated in FIG. 4G are calculated on the basis of the backlight luminance estimated values illustrated in FIG. 14F.

Hereinafter, an operation example of local dimming of the frame period 1 will be described.

Backlight control values 1431 of the subframe period 1 of the frame period 1 are generated by updating a backlight control value A1 of the control value subarea 1 of the backlight module 106 among the backlight control values 1430 of the frame period 0 with B1. The backlight control value A1 is a value that has been calculated in the previous frame period 0 and is stored in the memory 107, and the backlight control value B1 is a value that has been calculated on the basis of image data of the subframe 1 of the input image 1401.

The backlight luminance estimated value 1440 of the subframe period 1 of the frame period 1 is not updated from the backlight luminance estimated value 1440 of the subframe period 4 of the frame period 0. The backlight luminance estimated values C1 to C4 configuring the backlight luminance estimated values 1440 are values that have been calculated in the previous frame period 0 and are stored in the memory 107.

A correction coefficient 1450 of the subframe period 1 of the frame period 1 is not updated from the correction coefficient 1450 of the subframe period 4 of the frame period 0. Correction coefficients G1 to G4 configuring the correction coefficient 1450 are values that have been calculated in the previous frame period 0 and are stored in the memory 107.

Figure 15A:
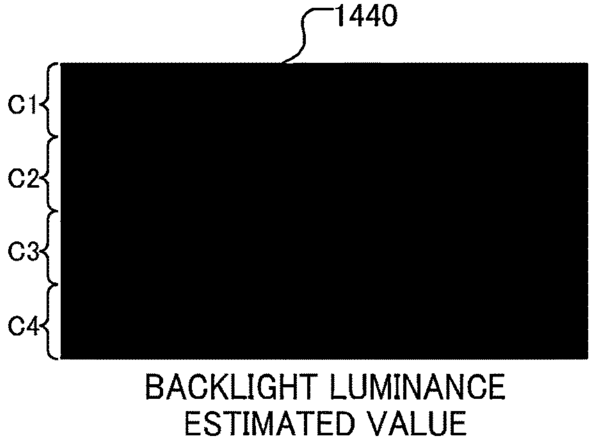
FIGS. 15A to 15D are diagrams schematically illustrating an example of backlight luminance estimated values of Embodiment 2.

As in Embodiment 1, backlight control values 1431 of the subframe period 1 of the frame period 1 are schematically illustrated in FIG. 6A. Backlight luminance estimated values 1440 of the subframe period 1 of the frame period 1 are schematically illustrated in FIG. 15A. FIGS. 15A to 15D are diagrams schematically illustrating an example of backlight luminance estimated values. In FIGS. 15A to 15D, a part of a heavy density represents that it has a small backlight luminance estimated value, and a part of a light density represents that it has a large backlight luminance estimated value.

Backlight control values 1432 of the subframe period 2 of the frame period 1 are generated by updating a backlight control value A2 of the control value subarea 2 of the backlight module 106 among backlight control values 1431 of the subframe period 1 with B2. The backlight control value A2 is a value that has been calculated in the previous frame period 0 and is stored in the memory 107, and the backlight control value B2 is a value that is calculated on the basis of image data of the subframe 2 in the input image 1401. In FIG. 6B, similar to Embodiment 1, the backlight control values 1432 are schematically illustrated.

Backlight luminance estimated values 1441 of the subframe period 2 of the frame period 1 are generated as below. A backlight luminance estimated value C1 of the luminance estimation subarea 2 of the backlight module 106 among backlight luminance estimated values 1440 of the subframe period 1 is updated with F1. The backlight luminance estimated value C1 is a value that has been calculated in the previous frame period 0 and is stored in the memory 107, and the backlight luminance estimated value F1 is a value that is calculated on the basis of the backlight control values 1432. The calculated backlight luminance estimated value F1 is stored in the memory 107.

Correction coefficients 1451 of the subframe period 2 of the frame period 1 are generated by updating a correction coefficient G1 of the correction target area 2 among correction coefficients 1450 of the subframe period 1 with H1. The correction coefficient G1 is a value that has been calculated in the previous frame period 0 and is stored in the memory 107. The correction coefficient H1 is a value that has been calculated on the basis of the backlight luminance estimated value F1 of the luminance estimation subarea 2 among backlight luminance estimated values 1441. The calculated correction coefficient H1 is stored in the memory 107.

In the backlight control values 1432 of the subframe period 2, backlight control values of the control value subareas 3 and 4 calculated on the basis of image data 1400 of the previous frame period 0 are A3 and A4. As illustrated in FIG. 6B, these backlight control values A3 and A4 are smaller than the backlight control values B1 and B2 of the control value subareas 1 and 2 calculated on the basis of the image data 1401 of the current frame period 1. As described in Embodiment 1, in a case in which backlight luminance is estimated and calculated on the basis of the backlight control values, the shorter a distance from an estimation point of backlight luminance, the larger a weight applied to the backlight control value becomes. Thus, the backlight luminance estimated value is calculated to be a smaller value as it is closer to the control value subareas 3 and 4. In Embodiment 1, as illustrated in FIGS. 3D and 2C, the luminance estimation subarea 2 that is a target for calculation of the backlight luminance estimated value in the subframe period 2 is located at the same position as that of the control value subarea 2 and is close to the control value subareas 3 and 4. For this reason, it becomes easy for the backlight control value based on the input image 1400 of the previous frame period of the control value subareas 3 and 4 to have an influence on the backlight luminance estimated value D2 of the luminance estimation subarea 2. Thus, as illustrated in FIG. 7B, a relatively large brightness/darkness difference occurs in accordance with a distance from the control value subareas 3 and 4.

Figure 15B:
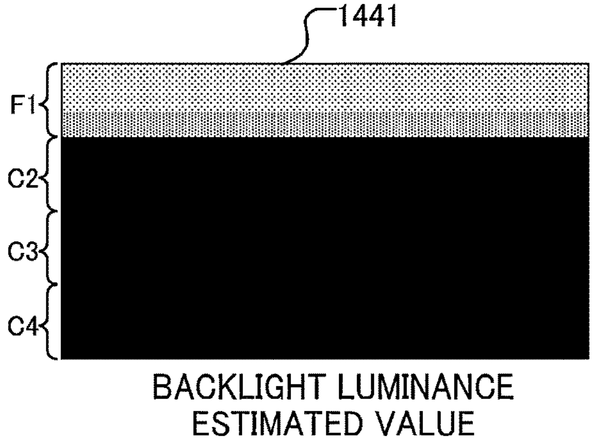
Figure 15C:
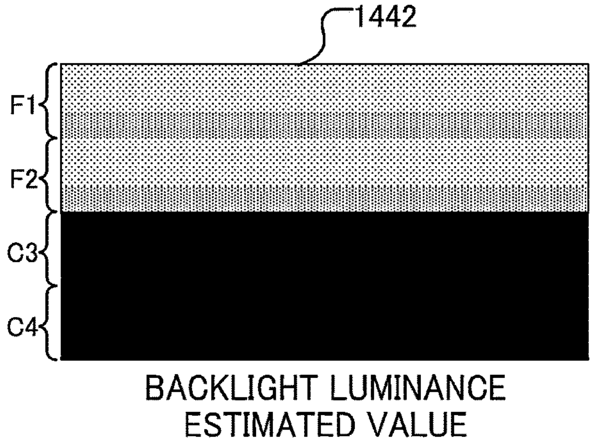

On the other hand, in Embodiment 2, as illustrated in FIGS. 13B and 13C, the position of the luminance estimation subarea 2 that is a target for calculation of the backlight luminance estimated value in the subframe period 2 is farther from the control value subareas 3 and 4 than in Embodiment 1. For this reason, it is difficult for the backlight control values of the control value subareas 3 and 4 calculated on the basis of image data 1400 of the previous frame period to have an influence on the backlight luminance estimated value F1 of the luminance estimation subarea 2. Thus, in the backlight luminance estimated value F1 of the luminance estimation subarea 2, as illustrated in FIG. 15B, a difference in the brightness and darkness according to a distance from the control value subareas 3 and 4 is relatively small.

Backlight control values 1433 of the subframe period 3 of the frame period 1 are generated by updating a backlight control value A3 of the control value subarea 3 of the backlight module 106 among backlight control values 1432 of the subframe period 2 with B3. The backlight control value A3 is a value that has been calculated in the previous frame period 0 and is stored in the memory 107, and the backlight control value B3 is a value that is calculated on the basis of image data of the subframe 3 in the input image 1401. Similar to Embodiment 1, backlight control values 1433 are schematically illustrated in FIG. 6C.

Backlight luminance estimated values 1442 of the subframe period 3 of the frame period 1 are generated as below. A backlight luminance estimated value C2 of the luminance estimation subarea 3 of the backlight module 106 among backlight luminance estimated values 1441 of the subframe period 2 is updated with F2. The backlight luminance estimated value C2 is a value that has been calculated in the previous frame period 0 and is stored in the memory 107, and the backlight luminance estimated value F2 is a value that is calculated on the basis of the backlight control values 1433. The calculated backlight luminance estimated value F2 is stored in the memory 107.

Correction coefficients 1452 of the subframe period 3 of the frame period 1 are generated by updating a correction coefficient G2 of the correction target area 3 among correction coefficients 1451 of the subframe period 2 with H2. The correction coefficient G2 is a value that has been calculated in the previous frame period 0 and is stored in the memory 107. The correction coefficient H2 is a value that has been calculated on the basis of the backlight luminance estimated value F2 of the luminance estimation subarea 3 among backlight luminance estimated values 1442. The calculated correction coefficient H2 is stored in the memory 107.

In the subframe period 3, on the basis of the backlight control values 1433 illustrated in FIG. 6C, a backlight luminance estimated value of the luminance estimation subarea 3 illustrated in FIG. 13C (F2 illustrated in FIG. 15C) is calculated. As can be known by comparing FIG. 15C with FIG. 6C, the position of the luminance estimation subarea 3 that is a target for calculation of the backlight luminance estimated value becomes separate from the control value subarea 4 in which the backlight control value A4 calculated on the basis of the image data 1400 of the previous frame 0 is used. For this reason, in the backlight luminance estimated value F2, the closer to the control value subarea 4 it becomes, the more influence of the backlight control value A4 based on the image data 1400 of the previous frame period 0 is received, and the degree of the influence is smaller than that of Embodiment 1. Thus, in the backlight luminance estimated value F2, a brightness/darkness difference according to a distance from the control value subarea 4 based on the image data 1400 of the previous frame period 0 is smaller than that according to Embodiment 1.

Backlight control values 1434 of the subframe period 4 of the frame period 1 are generated by updating a backlight control value A4 of the control value subarea 4 of the backlight module 106 among backlight control values 1433 of the subframe period 3 with B4. The backlight control value A4 is a value that has been calculated in the previous frame period 0 and is stored in the memory 107, and the backlight control value B4 is a value in the input image 1401 that is calculated on the basis of image data of the subframe 4. The backlight control value 1434 of the subframe period 4 is a value calculated on the basis of the input image 1401 of the frame period 1 in all the control value subareas. When the backlight control values 1434 are schematically illustrated, as illustrated in FIG. 6D, the backlight control values become uniform inside the screen and become control values causing display luminance of the backlight inside the screen to be uniform.

Figure 15D:
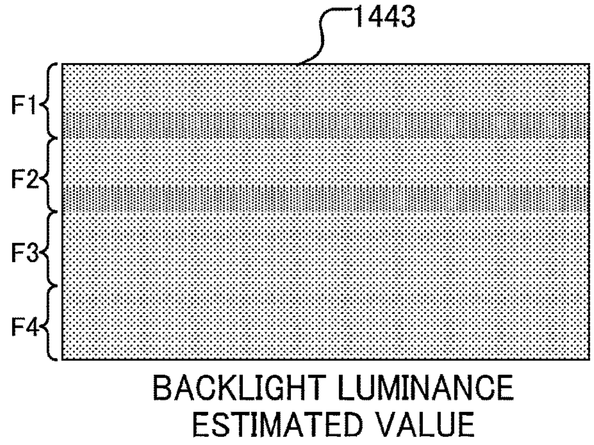

The backlight luminance estimated values 1443 of the subframe period 4 of the frame period 1 are generated as below. Backlight luminance estimated values C3 and C4 of the luminance estimation subarea 4 of the backlight module 106 among backlight luminance estimated values 1442 of the subframe period 3 are updated with F3 and F4. The backlight luminance estimated values C3 and C4 are values that have been calculated in the previous frame period 0 and are stored in the memory 107, and the backlight luminance estimated values F3 and F4 are values calculated on the basis of the backlight control value 1434. The calculated backlight luminance estimated values F3 and F4 are stored in the memory 107. Since the backlight control value 1434 is a control value causing display luminance of the backlight inside the screen to be uniform, as illustrated in FIG. 15D, the backlight luminance estimated values F3 and F4 of the luminance estimation subarea 4 become uniform.

Correction coefficients 1453 of the subframe period 4 of the frame period 1 are generated by updating correction coefficients G3 and G4 of the correction target area 4 among correction coefficients 1452 of the subframe period 3 with H3 and H4. The correction coefficients G3 and G4 are values that have been calculated in the previous frame period 0 and are stored in the memory 107. The correction coefficients H3 and H4 are values calculated on the basis of the backlight luminance estimated values F3 and F4 of the luminance estimation subarea 4 among backlight luminance estimated values 1443. The calculated correction coefficients H3 and H4 are stored in the memory 107.

Figure 16A:
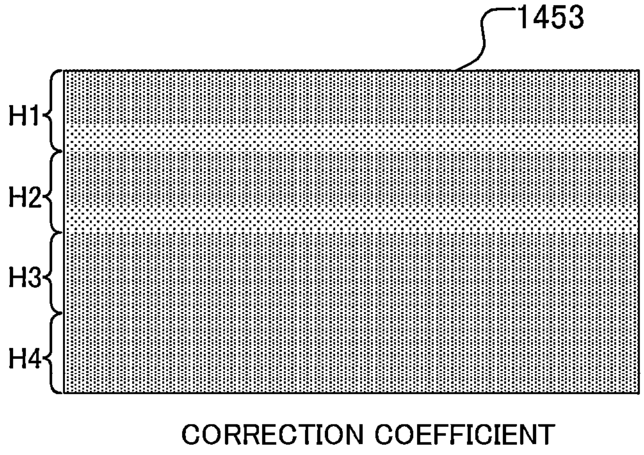
FIGS. 16A and 16B are diagrams schematically illustrating an example of image correction coefficients and corrected images of Embodiment 2.
Figure 16B:
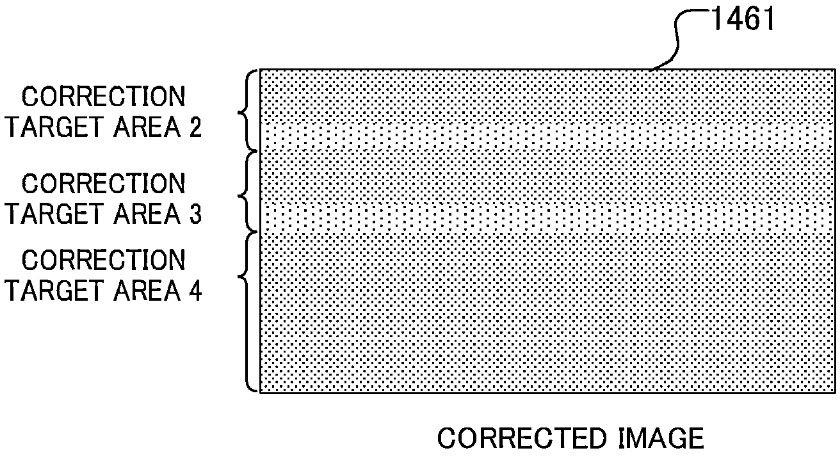

FIG. 16A illustrates correction coefficients for correcting input image data, and FIG. 16B is a diagram schematically illustrating an example of a corrected image acquired by correcting input image data using the correction coefficients. In FIG. 16A, a part of a heavy density represents that it has a small correction coefficient, and a part of a light density represents that it has a large correction coefficient. In FIG. 16B, a part of a heavy density represents that it has a small pixel value, and a part of a light density represents that it has a large pixel value.

In the frame period 1, in the last subframe period 4, a backlight control value 1434, a backlight luminance estimated value 1443, and a correction coefficient 1453 are generated, and the input image 1401 is corrected to be a corrected image 1461 using the correction coefficient 1453. Then, the backlight control value 1434 is output to the backlight control unit 105, and the backlight module 106 emits light on the basis of the backlight control value 1434. In addition, the corrected image 1461 is output to the liquid crystal panel control unit 103, and the liquid crystal panel 104 modulates light from the backlight module 106 on the basis of the corrected image 1461.

As illustrated in FIG. 6D, the backlight control value 1434 is a control value causing display luminance of a backlight inside the screen to be uniform. On the other hand, according to the backlight luminance estimated value 1443, as illustrated in FIG. 15D, a difference in brightness and darkness occurs inside the screen. The correction coefficient is calculated on the basis of a reciprocal of a backlight luminance estimated value. Thus, as the correction coefficient 1453 calculated on the basis of the backlight luminance estimated value 1443, as illustrated in FIG. 16A, a correction coefficient of a pixel of which a backlight luminance estimated value is small is large, and a correction coefficient of a pixel of which a backlight luminance estimated value is large is small. In the frame period 1, an input image 1401 that is similar to the input image 401 illustrated in FIG. 5B is input. Thus, a corrected image 1461 generated in the subframe period 4 of the frame period 1, as illustrated in FIG. 16B, becomes an image in which there is a difference in brightness and darkness inside the screen. The backlight module 106 is controlled such that the display luminance of a backlight inside the screen becomes uniform in the subframe period 4 of the frame period 1, and thus, as illustrated in FIG. 16B, an image in which there is a difference in the brightness and darkness inside the screen is displayed on the liquid crystal panel 104. However, in Embodiment 2, a luminance estimation subarea that is a target for calculation of a backlight luminance estimated value becomes far from a control value subarea in which the backlight control value calculated on the basis of the input image 1400 of the frame period 0 is used, and thus a difference in the brightness and darkness is small. Thus, a temporary rise or fall of the luminance occurring in a partial area of the display image can be inhibited.

Embodiments 1 and 2 (including modified examples) are merely examples, and configurations that can be acquired by appropriately modifying or changing the configurations of Embodiments 1 and 2 within the range of the gist of the present invention belongs to the present invention as well. Configurations acquired by appropriately combining the configurations of Embodiments 1 and 2 belong to the present invention as well.

According to the present disclosure, an occurrence of a processing delay and an increase in the circuit scale according to an increase in the amount of calculation relating to image correction in a display device performing local dimming can be inhibited.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127328, filed on Aug. 9, 2022, which is hereby incorporated by reference herein in its entirety.

What is claimed is:

1. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) calculate a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, wherein the emission luminance for the plurality of division areas calculated in a previous frame period is stored in a memory, and wherein each partial process includes a process of determining emission luminance of division areas other than the division areas for which emission luminance has been calculated before a current subframe period of a current frame period among the plurality of division areas of the backlight on the basis of the stored emission luminance calculated in the previous frame period.

2. The display device according to claim 1, wherein the input image data comprises a plurality of subframes, and each partial process includes a process of determining emission luminance for the division area corresponding to each subframe on the basis of image data of each subframe.

3. The display device according to claim 1, wherein the input image data comprises a plurality of correction target areas, and each partial process includes a process of calculating a correction value for correcting image data of each correction target area.

4. The display device according to claim 1, wherein the input image data comprises a plurality of correction target areas, and each partial process includes a process of calculating a correction value for correcting image data of each correction target area, and wherein, in each partial process, the division area located at a position of the correction target area and the division area for which the emission luminance is determined on the basis of emission luminance calculated in the previous frame period are not adjacent to each other.

5. The display device according to claim 1, wherein the input image data comprises a plurality of subframes and the input image data comprises a plurality of correction target areas, and each partial process includes a process of determining emission luminance for the division area corresponding to each subframe on the basis of image data of each subframe and calculating a correction value for correcting image data of each correction target area, and wherein, in each partial process, a position of the subframe and a position of the correction target area are the same.

6. The display device according to claim 1, wherein the input image data comprises a plurality of subframes and the input image data comprises a plurality of correction target areas, and each partial process includes a process of determining emission luminance for the division area corresponding to each subframe on the basis of image data of each subframe and calculating a correction value for correcting image data of each correction target area, and wherein, in each partial process, a position of the subframe and a position of the correction target area are different from each other.

7. The display device according to claim 1, wherein the process of calculating the correction value for correcting the input image data on the basis of the emission luminance includes a process of estimating a luminance distribution of light from the backlight emitted to the display panel on the basis of the emission luminance, and wherein the input image data comprises a plurality of correction target areas, and each partial process includes a process of estimating a luminance distribution in each correction target area and a process of calculating a correction value for correcting image data of each correction target area on the basis of the estimated luminance distribution in each correction target area.

8. The display device according to claim 1, wherein the transmittance of the display panel and light emission of the backlight are variable for every frame period on the basis of the calculated emission luminance and the correction value.

9. The display device according to claim 1, wherein the transmittance of the display panel and light emission of the backlight are variable for every subframe period on the basis of the emission luminance and the correction value calculated in each partial process.

10. The display device according to claim 1, wherein one frame period of the input image data comprises M subframe periods, and a partial process executed in an N-th (N=1 to M) subframe period among the plurality of partial processes includes a process of:

(a) dividing the input image data into M subframes in a vertical direction and determining emission luminance of the division area corresponding to an N-th subframe from the top on the basis of image data of the N-th subframe; and (b) dividing the input image data into M correction target areas in the vertical direction and calculating a correction value for correcting image data of an N-th correction target area from the top.

11. The display device according to claim 1, wherein one frame period of the input image data comprises M subframe periods, wherein a partial process executed in an N-th (N=1 to k, 1≤k<M) subframe period among the plurality of partial processes includes a process of dividing the input image data into M subframes in a vertical direction and determining emission luminance of the division area corresponding to an N-th subframe from the top on the basis of image data of the N-th subframe, and wherein a partial process executed in an N-th (N=k+1 to M) subframe period among the plurality of partial processes includes a process of:

(a) dividing the input image data into M subframes in a vertical direction and determining emission luminance of the division area corresponding to an N-th subframe from the top on the basis of image data of the N-th subframe; and (b) dividing the input image data into (M-k) (1≤ k<M) correction target areas in the vertical direction and calculating a correction value for correcting image data of an (N-k)-th correction target area from the top.

12. A control method of a display device, the display device including (a) a backlight comprising a plurality of division areas of which emission luminance is variable and (b) a display panel of which transmittance of light emitted from the backlight is variable for each pixel, the control method comprising:

calculating emission luminance for each division areas of the backlight on the basis of input image data;

calculating a correction value for correcting the input image data on the basis of the emission luminance;

correcting the input image data on the basis of the calculated correction value;

controlling the transmittance for each pixel of the display panel on the basis of corrected image data acquired through the correcting of the input image data; and controlling light emission of each division areas of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe periods, wherein the emission luminance for the plurality of division areas calculated in a previous frame period is stored in a memory, and wherein each partial process includes a process of determining emission luminance of division areas other than the division areas for which emission luminance has been calculated before a current subframe period of a current frame period among the plurality of division areas of the backlight on the basis of the stored emission luminance calculated in the previous frame period.

13. A non-transitory computer-readable medium that stores a program for causing a computer to execute a control method of a display device, the display device including (a) a backlight comprising a plurality of division areas of which emission luminance is variable and (b) a display panel of which transmittance of light emitted from the backlight is variable for each pixel, the control method comprising:

calculating emission luminance for each division areas of the backlight on the basis of input image data;

calculating a correction value for correcting the input image data on the basis of the emission luminance;

correcting the input image data on the basis of the calculated correction value;

controlling the transmittance for each pixel of the display panel on the basis of corrected image data acquired through the correcting of the input image data; and controlling light emission of each division areas of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe periods, wherein the emission luminance for the plurality of division areas calculated in a previous frame period is stored in a memory, and wherein each partial process includes a process of determining emission luminance of division areas other than the division areas for which emission luminance has been calculated before a current subframe period of a current frame period among the plurality of division areas of the backlight on the basis of the stored emission luminance calculated in the previous frame period.

14. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) calculate a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, wherein the input image data comprises a plurality of subframes and the input image data comprises a plurality of correction target areas, and each partial process includes a process of determining emission luminance for the division area corresponding to each subframe on the basis of image data of each subframe and calculating a correction value for correcting image data of each correction target area, and wherein, in each partial process, a position of the subframe and a position of the correction target area are the same.

15. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) calculate a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, wherein the input image data comprises a plurality of subframes and the input image data comprises a plurality of correction target areas, and each partial process includes a process of determining emission luminance for the division area corresponding to each subframe on the basis of image data of each subframe and calculating a correction value for correcting image data of each correction target area, and wherein, in each partial process, a position of the subframe and a position of the correction target area are different from each other.

16. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, wherein the process of calculating the correction value for correcting the input image data on the basis of the emission luminance includes a process of estimating a luminance distribution of light from the backlight emitted to the display panel on the basis of the emission luminance, and wherein the input image data comprises a plurality of correction target areas, and each partial process includes a process of estimating a luminance distribution in each correction target area and a process of calculating a correction value for correcting image data of each correction target area on the basis of the estimated luminance distribution in each correction target area.

17. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) calculate a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, and wherein one frame period of the input image data comprises M subframe periods, and a partial process executed in an N-th (N=1 to M) subframe period among the plurality of partial processes includes a process of:

(a) dividing the input image data into M subframes in a vertical direction and determining emission luminance of the division area corresponding to an N-th subframe from the top on the basis of image data of the N-th subframe; and (b) dividing the input image data into M correction target areas in the vertical direction and calculating a correction value for correcting image data of an N-th correction target area from the top.

18. A display device comprising:

a backlight comprising a plurality of division areas of which emission luminance is variable for each division area;

a display panel of which transmittance of light emitted from the backlight is variable for each pixel;

one or more memories storing instructions; and one or more processors, the one or more processors executing the instructions to:

(1) calculate emission luminance for each division area of the backlight on the basis of input image data;

(2) calculate a correction value for correcting the input image data on the basis of the emission luminance;

(3) correct the input image data on the basis of the calculated correction value; and (4) control the transmittance for each pixel of the display panel on the basis of corrected image data acquired through the correcting of the input image data and control light emission of each division area of the backlight on the basis of the calculated emission luminance, wherein a process of calculating the correction value for correcting the input image data on the basis of the emission luminance is divided into a plurality of partial processes, one frame period of the input image comprises a plurality of subframe periods, and the plurality of partial processes are sequentially performed by executing each partial process in each subframe period, wherein one frame period of the input image data comprises M subframe periods, wherein a partial process executed in an N-th (N=1 to k, 1≤k<M) subframe period among the plurality of partial processes includes a process of dividing the input image data into M subframes in a vertical direction and determining emission luminance of the division area corresponding to an N-th subframe from the top on the basis of image data of the N-th subframe, and wherein a partial process executed in an N-th (N=k+1 to M) subframe period among the plurality of partial processes includes a process of:

(a) dividing the input image data into M subframes in a vertical direction and determining emission luminance of the division area corresponding to an N-th subframe from the top on the basis of image data of the N-th subframe; and (b) dividing the input image data into (M-k) (1≤ k<M) correction target areas in the vertical direction and calculating a correction value for correcting image data of an (N-k)-th correction target area from the top.

* * * * *